United States Patent [19]
Ishii et al.

[11] Patent Number: 5,925,893
[45] Date of Patent: Jul. 20, 1999

[54] SEMICONDUCTIVE MEMBER AND PRODUCTION METHOD THEREOF

[75] Inventors: Yukihiro Ishii; Michiaki Yasuno; Minoru Rokutan; Mitsuo Fukuda; Jun Mihara; Yuzo Ozaki; Masato Takinami; Takeo Fusayama, all of Kanagawa, Japan

[73] Assignee: Fuji Xerox Co., Ltd., Toyko, Japan

[21] Appl. No.: 08/881,492

[22] Filed: Sep. 24, 1997

[30] Foreign Application Priority Data

| Jun. 24, 1996 | [JP] | Japan | 8-163211 |
| Oct. 15, 1996 | [JP] | Japan | 8-272414 |
| Dec. 6, 1996 | [JP] | Japan | 8-327165 |

[51] Int. Cl.$^6$ .................................................. H01L 35/24
[52] U.S. Cl. ........................ 257/40; 428/423.1; 399/159
[58] Field of Search ........................ 257/40; 428/423.1; 399/159, 330

[56] References Cited

U.S. PATENT DOCUMENTS

| 4,293,474 | 10/1981 | Dieterich et al. | 260/29.2 TN |
| 5,639,847 | 6/1997 | Chiang et al. | 528/71 |
| 5,705,274 | 1/1998 | Inoue et al. | 428/411.1 |
| 5,761,581 | 6/1998 | Nojima | 399/174 |

FOREIGN PATENT DOCUMENTS

| A-63-149669 | 6/1988 | Japan . |
| A-1-142569 | 6/1989 | Japan . |
| A-2-198470 | 8/1990 | Japan . |
| A-2-311867 | 12/1990 | Japan . |
| A-3-249777 | 11/1991 | Japan . |
| A-4-14070 | 1/1992 | Japan . |
| A-4-120564 | 4/1992 | Japan . |
| A-6-25431 | 2/1994 | Japan . |
| A-7-28301 | 1/1995 | Japan . |
| A-7-149448 | 6/1995 | Japan . |

OTHER PUBLICATIONS

Umeda Matsuzawa, Plastics Age (1994), pp. 104–109.

*Primary Examiner*—Sara Crane
*Attorney, Agent, or Firm*—Oliff & Berridge, PLC

[57] ABSTRACT

Semiconductive members such as charging members, copying members, pressure fixation rolls, electricity removing members and the like having a small environmental dependence are provided. The semiconductive member of the present invention contains a semiconductive substrate, a conductive rubber layer, an intermediate layer, a resistance control layer the constituent material of which is a polyurethane ionomer having an ionic segment in the molecule, and a surface layer. The ionic segment is selected from among a sulfonic acid group, a carboxyl group and a tertiary amino radical, or the salts thereof. In addition, the glass transition temperature of this polyurethane ionomer is 30° C. or less, and the volume specific resistance value is in the range of $10^6$ to $10^9$ W cm.

8 Claims, 5 Drawing Sheets

SEMICONDUCTIVE MEMBER AND PRODUCTION METHOD THEREOF

BACKGROUND OF THE INVENTION

1. Field of the Invention

The present invention relates to a semiconductive member used in image forming apparatuses such as the electrophotograph apparatus and static electric recording apparatus of copy machines, laser printers, facsimile machines or office automation equipment that is a combination of these. More particularly, the present invention relates to a semiconductive member used in various procedures in the image forming process of electricity removing members, pressure fixation rolls, copying members, and charging members that accomplish a uniform charging process on the surface of a body being charged, such as a photosensitive body or a dielectric, by pressing against the surface of the body being charged.

2. Description of Related Art

Technology wherein a series of image forming processes are established through control of static electricity is widely known. That is to say, in addition to procedures for directly controlling static electricity, such as charging, exposing, developing and copying, static electricity control (primarily as electricity removal) must also be accomplished in fixation and paper discharge procedures. To this end, a member having a uniform resistance with a volume specific resistance value in the range $10^5$ to $10^{14}$ Ω cm is required.

The members used in the field of image formation are generally composed of a conductive part and a resistance control part, and because the resistance value varies depending on the shape and size of the member, generally, in terms of the volume specific resistance value, a material with $10^8$ Ω cm or less is selected for the conductive part and a material with $10^5$ to $10^{14}$ is selected for the resistance control part. The function of the conductive part is to connect to ground and to supply electric current (connect to a power source), while the resistance control unit accomplishes resistance control in accordance with the functions of the other members.

In general, the volume specific resistance value of the material can be adjusted with relative ease for the region of $10^3$ Ω cm or less by using a conductivizing agent such as carbon black or the like, or for the range of $10^{14}$ or greater by using an insulating polymer material. However, even if the apparent volume specific resistance value is in the above-described range of $10^5$ to $10^{14}$ as the average value, there are many cases where the uniformity of resistance is poor, and there are many technically difficult points in uniformly adjusting the resistance in the useful region in the field of image formation.

For a member used in image forming apparatus, generally a roll-shaped semiconductive member can be used suitably, but members having the shape of belts, film, blades and brushes and the like are also used.

As one example of these semiconductive members, a charging roll comprised of various types of rubber materials and polymer materials for charging an electrophotograph photosensitive body is disclosed, for example, in Japanese Laid-Open Patent Publication 63-149669. In addition, numerous proposals have been made regarding in what range the electric resistance value of the roll and covering layer can be adjusted to obtain an effective charging amount. Certainly, a sufficient charging amount can be easily obtained using a conductive elastic roll formed and vulcanized after wrapping around a core metal a rubber material in which the electric resistance value has been adjusted through kneading this with a conductivizing agent such as carbon black or the like.

In addition, in contact charging members using a roll- or plate-shaped conductive elastic body, it is commonly known that the rubber hardness of the elastic body in the charging member should be made JIS A 40° or less in order to obtain uniform contact with the body being charged such as a photosensitive body. It is also known that a compound in which various softening agents are mixed into low hardness pliable silicone rubber and various hydrocarbon-based rubbers is used as a charging member with low hardness.

However, these rubber materials all contain migrating, low molecular weight substances. Consequently, when the charging member makes contact for a long time with a photosensitive body, for example, the problem arises that image defects such as streaks or white voids are created because of substances that have migrated to the photosensitive body. In addition, when the charging member is applied to a copy machine, the back surface of the copy material such as paper can be stained.

That is to say, in conventional semiconductive members, in particular charging members, a first problem is that when the hardness of the contact charging member is kept low and a low hardness charging member is used, it is difficult to avoid migration of the softening agent and the like to the body being charged.

A second problem is that when a roll made of a material with poor permanent warping characteristics such as SBR (styrene butadiene rubber), for example, out of the hydrocarbon rubbers, is left for a long period of time in contact with the body being charged, the roll deforms and charging cannot be accomplished properly.

As a third problem, in cases where there are pinholes in the surface of the body being charged and the conductive drum made of aluminum of the like is exposed, when the charging process is accomplished using the charging roll, a large electric current flows suddenly to the pinhole area, and the charging roll instantly ruptures. Simultaneously, the area of contact between the body being charged and the roll member suffers poor charging, causing straight line streaks to appear on the copy paper.

Furthermore, as a fourth problem, during continuous operation in a low temperature, low humidity environment, when continuous operation is executed while accomplishing exposure electricity removing using an LED, the electrical resistance rises dramatically, causing poor charging to occur.

A large number of countermeasures have been proposed from before to resolve the above-described problems.

To cope with the first problem, Japanese Laid-Open Patent Publication 2-311867, for example, proposes a conductive roll covered with a softening agent migration preventing layer containing a conductive agent with the primary component being N-methoxymethyl nylon covering the conductive elastic layer in which ketchen black and a naphthene-based oil, as a softening agent, are mixed into a hydrocarbon synthetic rubber. However, in this roll, the migration preventing effect is insufficient, and the thickness of the resistance adjusting layer on the migration preventing layer needs to be at least 50 μm. Consequently, problems arise that the hardness of the roll rises and the productivity during film formation is extremely low.

In Japanese Laid-Open Patent Publication 3-249777, a charging member is proposed which prevents the bleeding phenomenon known as roll trace by covering the elastic layer, in which carbon black is dispersed in a silicone rubber, with a surface layer in which the primary component is N-methoxymethyl nylon. However, in this charging member, while it is possible to make the thickness of the surface layer thinner, problems arise that the environment dependence of the electric resistance for the N-methoxymethyl nylon is large, and charging unevenness and leak defects occur easily.

In Japanese Laid-Open Patent Publication 4-120564, a charging material is proposed in which a lower resistance layer, in which carbon black with an oil absorption of 80 ml/100 g or less is dispersed in silicone rubber, is covered by an upper resistance layer in which conductive particles are dispersed in resin or rubber, and polyurethane is disclosed as the material for comprising the upper layer. However, in this charging member, problems arise that the uniformity of the electrical resistance and the environmental stability are poor, so that when the charging member is made to contact the surface of the photosensitive body for one month or more, tacking occurs with the photosensitive body. In addition, it is noted in this publication that good adhesion can be obtained if the upper layer and lower layer are adhered using a silane coupling agent, so the adhesion between the silicone rubber layer and the upper layer is poor and a special processing procedure is necessary in the adhesion process, in addition to peeling off of the film occurring over long-term use.

Japanese Laid-Open Patent Publication 6-25431 proposes an electrophotograph silicone rubber roller in which a silicone rubber compound, having a total concentration of low grade polymer siloxane and nonfunctional silicone oil of 5000 ppm or less, is formed into a roll shape and then undergoes a vacuum heating process to remove the migrating components such as the above-described siloxane and oil, and a method of producing such. However, this method has extremely low productivity because a procedure to remove the migrating components is necessary before or after formation, creating the problem that the bleeding prevention effect is not necessarily sufficient.

Concerning the second problem, it is commonly known from various types of documents that a good effect with no deformation of the nip part can be obtained if the above-described SBR and the like is avoided and silicone rubber and fluoro-silicone rubber and the like are used.

Concerning the third problem, generally a resistance control layer is provided which has a volume specific resistance value of $10^6$ to $10^{10}$ Ω cm, or more preferably $10^7$ to $10^9$ Ω cm. For example, in Japanese Laid-Open Patent Publication 1-142569, a conductive roll is proposed in which a resistance layer composed of epichlorohydrin-ethylene oxide copolymer rubber (ECO) with a volume specific resistance x thickness of $10^5$ to $10^7$ Ω cm² covers the conductive elastic layer. In other words, charging is possible using ECO, which has the lowest electrical resistance among general polymer materials, while insulation breakdown is prevented.

In Japanese Laid-Open Patent Publication 2-198470, a semiconductive roll is proposed containing perchlorate in the polymerizing compound having an ether coupling in repeated units. In this semiconductive roll, the perchlorate is configured in the oxygen atoms giving the ether coupling, and consequently the rise in the resistance is small even in low humidity environments. In addition, in Japanese Laid-Open Patent Publication 7-28301, a conductive roll is proposed in which a protective layer is provided on top of a base layer with a volume specific resistance of $10^6$ to $10^8$ Ω cm composed of an ion conductive foam to which quaternary ammonium and perchlorate have been added. In this conductive roll, the base layer itself has intermediate resistance, and consequently the permissible width of voltage impression is wide and image defects are prevented.

Furthermore, in a roll having carbon black merely dispersed in a rubber material and a polymer material, there are often problems with uniformity in resistance, and the phenomenon known as charge unevenness occurs. Accordingly, the role of the resistance control layer is large in the sense of securing uniformity in the resistance.

In Japanese Laid-Open Patent Publication 4-14070, a new proposal is made for creating a resin layer of a polyester amide composed of dibasic carboxylic acid, diol and ω-amino carboxylic acid, but no reduction to practice has been achieved yet.

In recent years, graft copolymer resins of polyether amide and polyester amide and the like and known as "electricity control resins" have been marketed (e.g., see Umeda, Matsuzawa, Plastics Age, 40(4), 104(1994)). These resins have a permanent static electricity preventing action when blended with resins having a high insulating ability with a tendency to cause adhesion of dust through static electricity, and consequently are widely used for example in the housings of office automation equipment. The volume specific resistance values of these resins are on the order of $10^9$ Ω cm, in a range making the resins usable as materials to compose the above-described resistance control layer.

However, when the above-described materials are used as the materials composing the resistance control layer, it has become clear that the following problems arise. That is to say, in conductive rolls having as the resistance layer ECO that has actually been marketed, the environmental dependence of the electrical resistance is large, the charging capability differs depending on the changes in the environment, the charging voltage is low in low temperature and low humidity environments and pinhole leaks occur easily in high temperature and high humidity environments. In particular, the resistance control layer cannot achieve the original performance in low temperature, low humidity environments.

In addition, with a conductive roll of the ion conduction type, the electrical resistance of the roll drops through the coordination of the ion conductivizing agent such as perchlorate or the like into the polymer material. Consequently, the initial charging poorness in low temperature, low humidity environments is resolved, but another serious, major flaw arises during continuous operation. That is to say, even in the ion conduction type, the resistance of the roll gradually increases after repeated usage in low temperature, low humidity environments as mentioned as the above-described fourth problem, and eventually poor charging occurs.

Furthermore, with a charging roll where the above-described electricity control resin is used as the material comprising the resistance control layer, there is efficacy on the point of preventing insulation breakdown, but perhaps because the resistance is too high, poor charging of the photosensitive body occurs in low temperature, low humidity environments.

However, in the copying procedure, generally a copying member with higher electrical resistance than in the charging procedure is used. This copying member also uses a rubber roll itself such as foam polyurethane with a volume specific resistance value in the range of $10^{10}$ to $10^{14}$ Ω cm, or such a roll with the surface thereof covered with a protective layer. However, even in this kind of copy roll the problem of resistance control is still not resolved. That is to say, when the attempt to control the resistance of the roll is made by dispersing particle-shaped conductive powder such as carbon black or the like, the variance in the surface resistance is large and copy unevenness occurs which is not acceptable in practice, perhaps because the structure between the conductive particles is solid, making dispersion difficult.

In addition, the electricity control resin in the market is preferable from the standpoint of the volume specific resistance value, but the hardness is too high making it impossible to form a suitable nip, and the hardness is in a range that makes usage impossible as a material for forming an elastic layer. This electricity control resin can be used as a material to cover the conductive foam urethane rubber, for example, but the environmental dependence of the resistance is high and as a result the environmental dependence of the copying ease is high, which is not acceptable in practice.

In the fixation procedure, there are many cases where the fixation apparatus is composed from a heating roll that heats the toner image on the copy paper and a pressure roll which is pressed against this. In this kind of fixation apparatus, when the surface protection layer of the pressure roll is insulated, static electricity accumulates and a phenomenon occurs wherein the toner adheres to the heating roll.

In order to prevent this, there are many cases where a covering layer is provided that gives a suitable conductivity. When the environment dependence of the electrical resistance of this covering layer is large, offsetting of the toner arises. The above-described electricity control resin is preferable from the standpoint of the volume specific resistance value as a pressing roll, but similar to the case of the above-described copy roll, the hardness of the elastic layer is in a range that makes usage impossible. For example, although this can be used as a covering material for conductive foam urethane rubber rolls, the environmental dependence of the resistance is high and as a result offsetting of the toner occurs because of fluctuations in the environment, which is not acceptable in practice.

Furthermore, a material suitable for accomplishing removal of electricity from the charged copy paper and the surface of the body being charged still does not exist for the same reasons as discussed above.

Thus, a material that can satisfy completely the resistance control of the member used in the various procedures of an electrophotograph apparatus and a static electric recording apparatus or the like currently does not exist.

SUMMARY OF THE INVENTION

Hence, in consideration of the current state of conventional technology discussed above, it is an objective of the present invention to provide a semiconductive member with small environmental dependence of the electrical resistance, and a method of producing such.

Furthermore, it is an objective of the present invention to provide a semiconductive charging member which: i) obtains uniform charging of the surface of the body being charged by forming a uniform nip; ii) prevents migration of the migrating components to the body being charged while being provided with a pliable elastic layer; iii) does not cause poor charging caused by permanent warping deformation to occur; iv) has a small environment dependence of the electrical resistance, and does not cause poor charging to occur even in low temperature, low humidity environments; v) has stable resistance and does not cause poor charging even during repeated usage and in low temperature, low humidity environments; and vi) is superior is terms of productivity.

The inventors of the present invention, while earnestly seeking a material which realizes a semiconductive member with superior environment stability of the electrical resistance and which is suitable for resistance control of the semiconductive member primarily in an image forming apparatus, discovered that the above-described objectives and others could be achieved by using as the material composing the conductive layer a polyurethane ionomer having in the molecule an ionic segment such as a sulfonic acid group, even if the ion conduction material had large dependence of the electrical resistance on the environment in general.

It was discovered that this semiconductive member is suitable for charging members, copy members, pressure fixation rolls, cleaning and electricity removing blades, and the like, and in particular, not only is the environmental dependence of the resistance low but poor charging does not occur even with repeated use in low temperature, low humidity environments when the semiconductive material is used as a charging member.

Furthermore, it has been discovered that silicone rubber and fluoro-rubber have superior mutual adhesion, when the former, with which a low hardness elastic body is easily formed, is a constituent component of a conductive rubber layer and the latter covers the top of this rubber layer, a charging member with high speed capabilities even in low temperature, low humidity environments can be obtained, and in addition staining of the body being charged by bleeding of the migrating components from within the charging member is not seen.

The inventors of the present invention achieved the present invention on the basis of the above-described experience.

DETAILED DESCRIPTION OF PREFERRED EMBODIMENTS

That is to say, the semiconductive member of the present invention comprises at least a conductive substrate and a conductive layer containing a polyurethane ionomer, wherein the polyurethane ionomer has in the polymer at least one type of ionic segment selected from a sulfonic acid group, a carboxyl group or a tertiary amino radical, or the salts thereof.

In addition, the method for producing the semiconductive member of the present invention comprises at least: a procedure for forming a rubber composite containing a rubber material and a conductivizing agent, vulcanizing this and forming a conductive rubber layer on a conductive substrate; and a procedure for forming a resistance control layer on said conductive rubber layer by coating and heating a coating solution containing the above-described polyurethane ionomer.

Furthermore, the semiconductive charging member of the present invention comprises a semiconductive member made of a conductive substrate with at least a conductive rubber layer and a resistance control layer formed thereon, wherein the resistance control layer has as a constituent component the above-described polyurethane ionomer, with the glass transition temperature of the polyurethane ionomer being 30° C. or less and the volume specific resistance value thereof being in the range of $10^6$ to $10^9$ Ω cm.

And furthermore, the semiconductive charging member of the present invention is a semiconductive member for charging the surface of a body being charged by a voltage being impressed when the member is pressed against the surface of the body being charged, and the semiconductive member is composed of at least a three layer structure with an intermediate layer present between the above-described conductive rubber layer and resistance control layer, and the conductive rubber layer has silicone rubber as a constituent component, and the intermediate layer has fluoro-rubber as a constituent component.

The semiconductive member of the present invention is used in various procedures for the image forming processes of: charging members that uniformly charge the surface of a body being charged by pressing against the body being charged, such as a photosensitive body or dielectric or the like; copying members that copy the toner image on the body being charged or an intermediate copying body to a copy material or copy the toner image on the body being charged to an intermediate copy body; pressure fixation rolls for fixing the unfixed toner image to the copy material; and electricity removing members for removing the residual charge on the surface of the body being charged and the charge on the copy material.

Figure 1A:
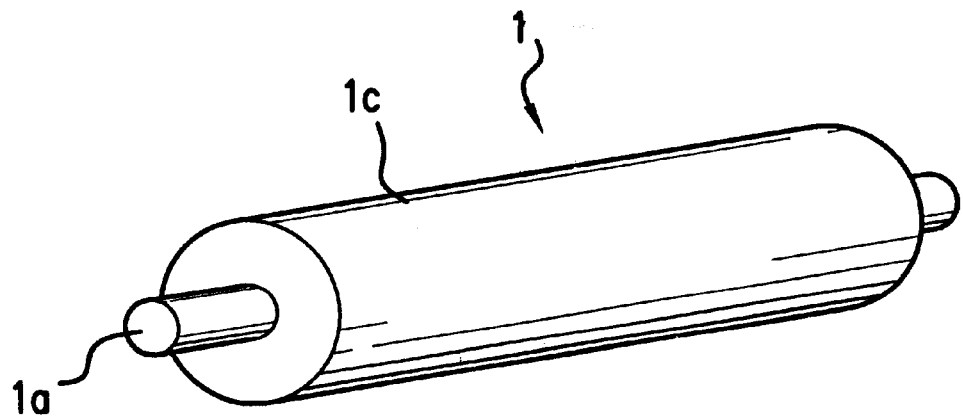
FIG. 1A is an oblique view of a semiconductive member with a two layer structure as one embodiment of the present invention.
Figure 1B:
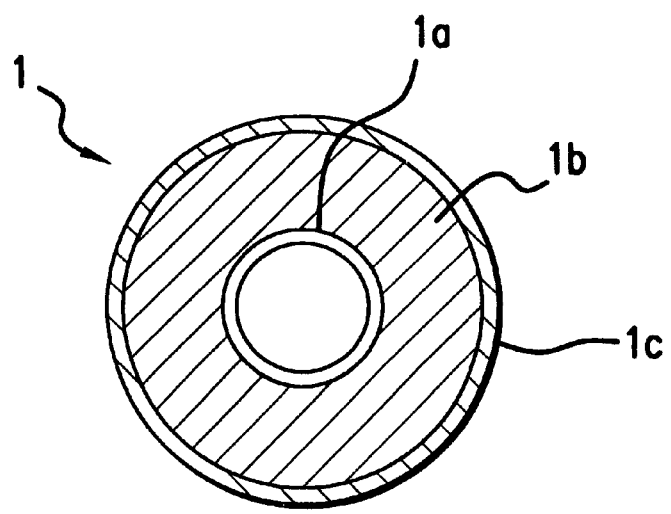
FIG. 1B is a cross-sectional view thereof.
Figure 2A:
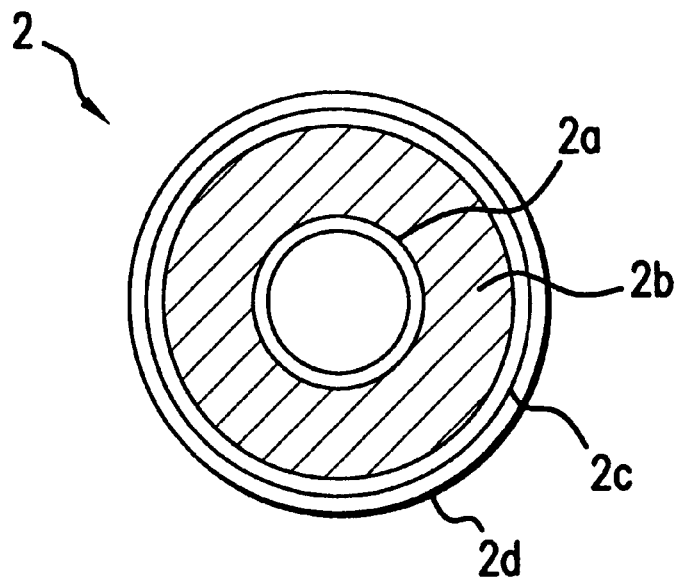
FIG. 2A is a cross-sectional view of a semiconductive member with a three layer structure as another embodiment of the present invention.
Figure 2B:
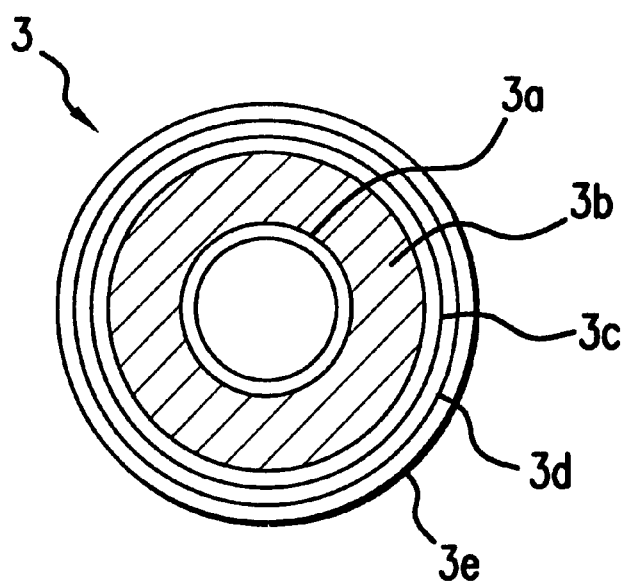
FIG. 2B is a cross-sectional view of a semiconductive member with a four layer structure.

Using the case where the semiconductive member is used as a semiconductive roll as an example, the layer structure is a two layer structure wherein a conductive elastic layer 1b is anchored onto the outer periphery of a semiconductive substrate 1a and a surface layer 1c covers the elastic layer 1b, as shown in FIG. 1A and FIG. 1B. Furthermore, this may be composed of a three or four layer structure where the outer periphery of a conductive substrate 2a and 3a is successively covered with a conductive rubber layer 2b, an intermediate layer 2c and a resistance control layer 2d, or a conductive rubber layer 3b, an intermediate layer 3c, a resistance control layer 3d and a surface layer 3e, as shown in FIG. 2A and FIG. 2B.

Thus, the conductive elastic layer of the two layer structure and the conductive rubber layer, the intermediate layer and the resistance control layer of the three and four layer structures respectively correspond to the "conductive layer" in the present invention. In addition, the above-described intermediate layers 2c and 3c may be formed as necessary, and the case of a layer structure which does not require this layer corresponds to a layer structure in which the lower layer of the conductive elastic layer 1b is taken to be the rubber layer 2b or 3b and the upper layer is taken to be the resistance control layer 2d or 3d, and clearly enclosing the boundaries of the two layers is not necessary. Furthermore, the surface layer 1c or 3e may also be formed as necessary. Accordingly, the semiconductive member of the present invention may employ a layer structure having from one to four layers. As is clear from the above layer structure, the resistance control layer formed "on the conductive rubber layer" or forming the resistance control layer does not necessarily mean directly covering the conductive rubber layer with a resistance control layer.

The conductive substrate (1a, 2a, 3a) of the semiconductive member of the present invention functions as a support member and an electrode for the semiconductive member, and is made of a conductive material having a bar-shape or a pipe shape with circular cross-section, for example a metal such as aluminum, a copper alloy or stainless steel, or resin or steel on which a plating process has been accomplished using an alloy, chrome or nickel or the like.

Next, the semiconductive member (1) composed of a two layer structure will be described in detail.

The conductive elastic layer 1b can be made alone of the below-described polyurethane ionomer having in the molecule an ionic segment. In this case, the ionomer exhibits a rubber elasticity hardened by a multi-functional bridging agent such as a polyisocyanate.

The conductive elastic layer may be composed, as necessary, from the polyurethane ionomer and one or both of a high resistance rubber material and a low resistance conductivizing agent. In this case, the rubber hardness and appropriate volume specific resistance value are normally adjusted in accordance with the objective of usage as a charging member, copying member, pressure fixation roll or electricity removing member or the like by including one or the other of the rubber material and the conductivizing agent. For example, when the semiconductive member is used as a charging member, it is preferable for this value to be in the range $10^5$ to $10^9$ Ω cm.

In addition, the thickness of the conductive elastic layer may be in the range of 1 to 5 $\mu$m, and more preferably in the range of 2 to 4 $\mu$m. When the thickness of the elastic layer is less than 1 $\mu$m, the layer receives the influence of the conductive substrate and the uniformity of the nip may be lost. On the other hand, when the thickness is thicker than 5 $\mu$m, material costs rise in addition to the apparatus becoming bulkier.

As a rubber material suitably blended, there are no particular limitations, but natural rubber, isoprene rubber, chloroprene rubber, epichlorohydrin rubber, norubonen rubber, urethane rubber, silicone rubber, fluoro-rubber, acrylic rubber, SBR, NBR, EPDM, acrylonitrol-butadiene-styrene rubber and the like are used, and the material may be a blend of these.

As the above-described conductivizing agent suitably mixed in, it is possible to use various conductive metals or alloys such as carbon black, graphite, aluminum, copper, nickel, tin or stainless steel, or various conductive metal oxides such as tin oxide, indium oxide, titanium oxide, zinc oxide, a compound oxide of tin oxide-antimony oxide, or a compound oxide of tin oxide-indium oxide, or an insulating material the surface of which has undergone a conductivizing process.

Here, the polyurethane ionomer in the present invention will be described in detail.

Usable as the above-described polyurethane ionomer is, for example, the reaction product obtained by causing a polyisocyanate and a long chain polyol, and also a chain extending agent as necessary, to react in the presence of a catalyst. In addition, the ionic segment is preferably introduced as the constituent of one or both of the long chain polyol and the chain extending agent.

Among the organic polyisocyanates that can be cited are aliphatic diisocyanates such as tetramethylene diisocyanate, hexamethylene diisocyanate, 3-methyl-1,5-pentane diisocyanate, lysine diisocyanate and the like; alicyclic diisocyanates such as isophorone diisocyanate, hydrotolylene diisocyanate, hydroxylilene diisocyanate, hydrotetramethylxylilene diisocyanate, hydrodiphenylmethane diisocyanate and the like; aromatic diisocyanates such as m-phenylene diisocyanate, p-phenylene diisocyanate, 2,4-tolylene diisocyanate, 2,6-tolylene diisocyanate, m-xylilene diisocyanate, diphenyl-4,4'-diisocyanate, 2-nitrodiphenyl-4,4'-diisocyanate, 3,3'-dimethoxydiphenyl-4,4'-diisocyanate, diphenylmethane-2,4'-diisocyanate, diphenylmethane-4,4'-diisocyanate, 3,3'-dimethyldiphenylmethane-4,4'-diisocyanate, b, b-diphenylpropane-4,4'-diisocyanate, diphenylether-4,4'-diisocyanate, 1,4-naphthalene diisocyanate, 1,5-naphthalene diisocyanate and the like; polymers of these; substances with polyols added, such as trimethylol propane and the like; and prepolymers of polyols and polyisocyanates having an isocyanate group at the end.

Among the long chain polyols are a) polyester polyol, b) polycarbonate polyol, c) polyether polyol, and copolymer polyols of these.

The a) polyester polyols include polyester polyols and polyester amide polyols obtained from a condensation reaction between dibasic acids and reactive acid derivatives of their esters, acid halides and acid anhydrides with solitary or mixed glycol and amino alcohol.

As the above-described dibasic acids, succinic acid, adipinic acid, sebacic acid, azelaic acid, phthalic acid, isophthalic acid, terephthalic acid, hexahydrophthalic acid, hexahydroisophthalic acid, hexahydroterephthalic acid, dicarboxylic acids such as naphthalene dicarboxylic acid, and the reactive acid derivatives thereof can be cited.

As the above-described glycols, ethylene glycol, propylene glycol, 1,3-propane diol, 1,2-butane diol, 1,4-butane diol, 1,5-pentane diol, neopentylene glycol, 1,6-hexane diol, 3-methyl-1,5-pentane diol, 1,8-octane diol, 1,9-nonane diol, diethylene glycol, triethylene glycol, dipropylene glycol, 1,4-cyclohexane dimethanol, and the ethylene oxide or propylene oxide additive of bisphenol A and the like can be listed.

As the above-described amino alcohols, enthanol amine, propanol amine, ε-aminohexanol and the like can be listed. In addition, it is possible to substitute a portion of the above-described glycols with amines such as hexamethylene diamine, isophorone amine and xylilene diamine and the like. Furthermore, lactone polyester polyol obtained through ring-opening polymerization of lactone monomers such as ε-caprolactone and the like are also included.

The b) polycarbonate polyols are generally obtained by the dealcoholization (or dephenolization) reaction of polyatomic alcohol with ethylene carbonate, dimethyl carbonate, diethyl carbonate and diphenyl carbonate and the like.

The above-described polyatomic alcohols used include ethylene glycol, propylene glycol, 1,3-propane diol, 1,2-butane diol, 1,4-butane diol, 1,5-pentane diol, neopentylene glycol, 1,6-hexane diol, 3-methyl-1,5-pentane diol, 1,8-octane diol, 1,9-nonane diol, diethylene glycol and 1,4-cyclohexane dimethanol, or mixtures of these.

The c) polyether polyols include polyethylene glycol, polypropylene glycol and polytetramethylene glycol and the like obtained through ring-opening polymerization of ethylene oxide, propylene oxide and tetrahydrofuran and the like, copolymers of these, and polyesterether polyols having the above-described polyester polyols and polycarbonate polyols as copolymer components.

It is desirable for these long chain polyols to be in the molecular weight range of 300 to 10000. By "molecular weight" is intended any molecular weight, including weight average molecular weight, number average molecular weight, etc., determined in accordance with well known methods. When the molecular weight is less than 300, the functional group concentration of the polyol component that is the charge carrier in the polyurethane ionomer in which the ionic segment is configured may not be sufficient, and the resistance may rise. On the other hand, when the molecular weight is larger than 10000, crystallization caused by the polyol component may partially occur, the ionic segment movement according to the above-described functional group that is the charge carrier may be prevented and ion conductivity may be hindered. In addition, by selecting the polyol constituent components and adjusting the polymerization, it is possible to adjust the resistance of the conductive elastic layer (1b) or the below-described resistance control layer (2d, 3d) to the desired range.

Even in the above-described long chain polyol, aliphatic long chain polyalkylene glycol and polyethylene glycol and polypropylene glycol with molecular weights in the above-described range, mixtures of these two or copolymers of these are preferably used as the optimum polyol for a charging member. Ethylene oxide and propylene oxide are also included as optimum polyol components.

The chain extending agent is generally a compound having two or more active hydrogens in a molecule with molecular weight less than 300, and polyols, polyamines, and amine alcohols and the like are used. Here again, "molecular weight" is intended to mean any molecular weight, however measured.

Specifically, ethylene glycol, propylene glycol, 1,3-propane diol, 1,2-butane diol, 1,4-butane diol, 1,5-pentane diol, neopentylene glycol, 1,6-hexane diol, 3-methyl-1,5-pentane diol, 1,8-octane diol, 1,9-nonane diol, diethylene glycol, triethylene glycol, dipropylene glycol, 1,4-cyclohexane dimethanol, and the ethylene oxide or propylene oxide additive of bisphenol A, glycerin, trimethylol propane and other polyols; hexamethyline amine, isofuran diamine, xylilene amine, methylene-bis(chloroaniline) and other polyamines; ethanol amine, propanol amine, ε-aminohexanol and other amino alcohols may be listed as examples. In addition, it is also possible to use water or urea as chain extending agents.

When the total number of moles of the chain extending agent is larger than the number of moles of the long chain polyol, the rate of urethane coupling with strong cohesive power increases and the rate of hard segments in the urethane increases. Consequently, the ion conduction of the polyurethane ionomer is hindered, and the volume specific resistance value becomes higher than is necessary. Accordingly, when a chain extending agent is used, the number of moles thereof should be kept below the total number of moles of the long chain polyol, and more preferably to half or less than this.

The ionic segment is selected from a sulfonic acid group, a carboxyl group or a tertiary amino radical, or the salts thereof, and is described by the chemical formula below.

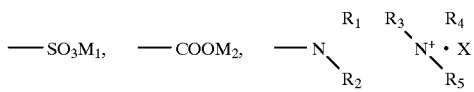

In the formula, $M_1$ and $M_2$ respectively indicate hydrogen atoms or cations, and when the valency of the cation is two or more, sulfonic acid groups or carboxyl groups in number corresponding to this valency couple with $M_1$ or $M_2$. $R_1$ and $R_2$ indicate displacement or non-displacement hydrocarbon groups. $R_3$, $R_4$ and $R_5$ may be the same or different, and each indicate displacement or non-displacement hydrocarbons, and one of these may be a hydrogen atom. In addition, $X^-$ indicates an anion.

As described above, preferably by causing a reaction between an organic polyisocyanate and a long chain polyol and/or a chain extending agent that has displaced the above-described ionic segment, at least one type of ionic segment is introduced in the urethane polymer. When the ionic segment indicates a salt, the sulfonic acid group and the carboxyl group are neutralized in various salts either before the reaction making the polyurethane or after the reaction, and it is possible to add various acids to the tertiary amino group or to convert the tertiary amino group into a quaternary ammonium salt using various halides or sulfonic acid esters or the like.

As the monomer component of the long chain polyol having a sulfonic acid group, or the chain extending agent (these compounds having the ionic segment are hereafter called the ionic compounds), 1,4-butanediol-2-sulfonic acid, 5-sulfoisobutylic acid, monomethyl or dimethylester of succinic acid or carboxylic acid, or the like, or the ammonium salt or sodium or potassium sulfonic acid alkali metal salt of these may be cited as examples.

As the ionic compound having a carboxyl group, 2,3-dihydroxy propionic acid, 2,2-dimethylolpropionic acid, tartaric acid, 2-methyl tartartic acid, 2,3-dihydroxyisobutyric acid, 2,3-dihydroxy-2-isopropylbutyric acid, 3,11-dihydroxymyristic acid, 9,10-dihydroxystearic acid, 2,6-dihydroxy-1,2-dihydro-4-pyridine carboxylic acid and the like, or the alkali metal salt or ammonium salt of these may be cited as examples.

As the ionic compound having a tertiary amino group, N-methyldimethanol amine, N-methyldiethanol amine, N-methyldipropanol amine, N-methyldihexanol amine, N-methyldioctanol amine, the N-ethyl displacement compound, the N-propyl displacement compound, the N-butyl displacement compound or the N-phenyl displacement compound of these, or 3-dimethylamino-1,2-propane diol, 4-dimethylamino-1,2-butane diol, 5-dimethylamino-1,2-pentane diol, or the diethylamino compounds of these, p-(2-hydroxymethyl-3-hydroxypropyl)-N,N-dimethyl aniline, p-(3-hydroxymethyl-4-hydroxybutyl)-N,N-dimethyl aniline, or the diethylamine compounds or triphenylamine compounds of these, or N-(3-dimethylaminopropyl) diisopropanol amine or the like, or a mineral acid such as hydrochloric acid, bromic acid, sulfuric acid or phosphoric acid of these, or the additive salt of various organic acids may be cited as examples.

The quaternary ammonium salt may be obtained by quaternizing the above-described tertiary amino group using methyl chloride, ethyl chloride, propyl chloride, butyl chloride, hexyl chloride, dodecyl chloride, hexadecyl chloride, octadecyl chloride, chlorocyclohexane, chlorobenzene, chlorotoluene, benzyl chloride or the like, or halides such as the bromides or iodides or these; or methane methyl sulfonate, benzene methyl sulfonate, p-toluene methyl sulfonate, acetone dimethyl disulfonate or the like, or ester sulfonates such as the ethyl esters, propyl esters, butyl esters, hexyl esters, heptyl esters, octyl esters, 2-methoxyethyl esters or phenyl esters of these. Naturally, it is also possible to obtain the quaternary ammonium salt using commonly known methods from other nitrogen-containing compounds such as primary or secondary amines.

As specific quaternary ammonium salts, N,N-dimethyl-N,N-di(2-hydroxyethyl) ammonium chloride, N-methyl-N-ethyl-N,N-di(2-hydroxyethyl) ammonium chloride, ammonium chlorides in which an N-ethyl group is converted to a N-propyl group, N-butyl group, N-pentyl group, N-hexyl group, N-heptyl group, N-octyl group, N-nonyl group, N-decyl group or the like, or the N,N-di(2-hydroxypropyl) ammonium chloride, N,N-di(2-hydroxybutyl) ammonium chloride, N,N-di(2-hydroxyhexyl) ammonium chloride, N-(2-hydroxyethyl)-N-(2-hydroxypropyl) ammonium chloride of these; or ammonium chlorides in which the above-described N-methyl group is converted to a hydrocarbon group for which a chloride other than methyl chloride was shown as an example, or the salt where a chloride anion is converted into a bromide, iodide or p-toluene sulfonate.

The organic polyisocyanate, long chain polyol, chain extending agent and ionic compounds above can be used separately or with two or more types mixed together. In addition, the long chain polyol in which an ionic segment has been introduced is preferably in the molecular weight range of 300 to 10000 for the same reasons as discussed above.

Furthermore, as catalysts, tertiary amines such as triethyl amine or the like, potassium acetate, zinc stearate and other carboxylic acid metal salts, dibutyl tin dilaurate, dioctyl tin dilaurate, dibutyl tin oxide and other organic metal compounds may be cited as examples.

For the polyurethane ionomer in the present invention, it is suitable to introduce the ionic segment into the molecule at a concentration of 0.001 to 1 millimole per 1 g. When there is less than 0.001 millimole of the above-described ionic segment, the resistance of the polyurethane ionomer itself may not be lowered very much, and there is little additional efficacy if the amount is greater than 1 millimole. The ionic segment supplies ions involved in conductivity of the semiconductive member. However, contrary to the prior expectation, it was confirmed by the inventors that the resistance of the ionomer rises even if the ionic segment concentration in the polyurethane ionomer is too high.

In a polyurethane ionomer such as is described above, the volume specific resistance value is preferably in the range $10^6$ to $10^9$ $\Omega$ cm, and is in an appropriate resistance region as a conductive layer in a member such as a charging member. Moreover, the glass transition temperature (Tg) of the polyurethane ionomer is preferably 30° C. or less, which is suitable as a material comprising the conductive layer. As the reason for this, it is assumed that the conducting mechanism of the polyurethane ionomer is conduction via ion transport by the segment movement of the polymer, which is more beneficial in ion conduction the lower Tg is, so it is especially preferable at 0° C. or less. For types where the Tg is such that segment movement is frozen at 30° C. or less, a volume specific resistance value suitable for the conductive layer is obtained.

In the semiconductive member of the present invention, tacking to the surface being charged occurs in conjunction with the Tg of the polyurethane ionomer being low, and in this case it is desirable to cover the conductive elastic layer with a surface layer (1c). The surface layer is preferably made of a polymer material with high friction resistance, such as a polyamide resin or a polyurethane resin.

As a polyamide resin, non-crystal resins such as water-soluble nylon or alcohol-soluble nylon may preferably be used. For example, water-soluble denatured polyamide resin such as AQ nylon A-70, A-90, P-70 or the like sold by Toray Industries Inc., or alcohol-soluble copolymer nylon such as Amilan CM-4000, CM-4001, CM-8000, CM-831, CM-833, CM-842 and the like may be cited as examples. In addition, the amide group is ideally N-methoxymethyl Trejin EF-30T or Trejin G-550 (produced by Teikoku Kagaku), Luckmide 5003 (produced by Dainippon Ink & Chemicals Inc.) or T-8 nylon (produced by Unitika Ltd.) or the like.

These polyamide resins are soluble, and consequently suited for the formation of films through a coating method. When N-methoxymethyl polyamide is used, the polyamide itself may be bridged through a dealcohol reaction in the presence of a catalyst such as lauric acid, crotonic acid, succinic acid, glutaric acid, lactic acid or the like.

As the polyurethane resin, Hi-urethane No. 2000, No. 5000, No. 5001 (produced by NOF Corp.) or Nipporan 125, 800 and 1100 (produced by Nippon Polyurethane Industry Co.) may be cited. In addition, when a fluorine resin denatured polymer is used, it is possible to avoid surface staining of the semiconductive member. That is to say, a coating with a bridging structure created by reacting Kampeflon HD (produced by Kansai Paint Co.) and Lumiflon series (produced by Asahi Glass Co.) with polyol polyisocyanate compounds such as the trimethylol propane additive of hexamethylene diisocyanate, the trimethylol propane additive of tolylene diisocyanate, or an amino resin such as melamine resin, is ideal. Furthermore, it is also possible to use alone a fluoro-rubber with carbon fluoride as the conductivizing agent, or the polyurethane ionomer of the present invention.

For the surface layer, the above-described conductivizing agent is dispersed and the volume specific resistance value is adjusted to the same order as that of the conductive elastic layer (1b). The thickness of the surface layer is preferably in the range 2 to 50 μm and more preferably in the range of 5 to 40 μm. When the thickness is thinner than 2 μm, there is the worry that the semiconductive member will wear out over long-term use, and when the thickness is thicker than 50 μm, the hardness of the semiconductive member may rise more than necessary.

Next, the semiconductive member (2,3) composed of a 3 or 4 layer structure will be described in detail.

The conductive rubber layer (2b, 3b) is made of a rubber material and a conductivizing agent. As the rubber material, a material which is the same as the above-described rubber material blended appropriately in order to adjust the volume specific resistance value of the conductive elastic layer (1b) may be used, and this may be foamed or unfoamed.

The above-described conductivizing agent is dispersed in this rubber layer, and the volume specific resistance value is adjusted to $10^8$ Ω cm or less while the hardness is JIS A 20 to 80°. Concerning the former volume specific resistance value, this is a necessary requirement in order to supply electricity between the resistance control layer and the surface layer. Concerning the latter hardness, this is a necessary requirement for uniformity in the nip of the semiconductive member caused by pressing against the body being charged. In addition, the thickness of the rubber layer may be in the range of 1 to 5 μm the same as with the above-described semiconductive elastic layer (1b).

The rubber material is such that the volume specific resistance value of the material itself is at least $10^9$ Ω cm and normally $10^{12}$ Ω cm or greater, and consequently usually carbon black is used as the conductivizing agent from the standpoint of cost. Carbon black has strong reinforcability, and consequently it is necessary to balance resistance and hardness. When this is done, the optimum range for conductivity and rubber hardness differs because of the requirements on the body being charged and the charging system, and consequently a design in accordance with the system is necessary. In order to establish both the above-described conductivity and rubber hardness, silicone rubber and urethane rubber are ideal, and it is possible to lower the hardness of the semiconductive member without mixing in a softening agent such as process oil or a plasticizing agent.

When the conductive rubber layer is made of silicone rubber or urethane rubber or a rubber material other than foam rubber such as SBR or the like, for example, mixing the above-described softening agent into the rubber material and controlling the conductivity and rubber hardness individually is an effective means. In this case, there are times when the softening agent is extracted and the resistance value of the resistance control layer rises and staining is caused on the surface being charged, and hence it is preferable to provide an intermediate layer (2c, 3c) on the rubber layer, and this intermediate layer also functions as a primer layer.

The intermediate layer is preferably made of fluoro-rubber, polyurethane resin or polyamide resin the same as the above-described surface layer (1c). Among these, fluoro-rubber having N-methoxymethyl polyamide resin or polyfluoride vinylidene as the primary component is ideal. An appropriate conductivizing agent is mixed into the intermediate layer. The thickness of this is not particularly restricted, but is normally in the range of 5 to 50 μm.

The resistance control layer (2d, 3d) is provided in order to adjust the semiconductive member to a predetermined volume specific resistance value, and is made of the same layer composition as the above-described conductive elastic layer (1b), being made of polyurethane ionomer alone or this with another polymer material or conductivizing agent.

The polyurethane ionomer is more beneficial for ion conduction the lower the Tg, as discussed above, and an ionomer with a Tg of 0° C. or less is particularly ideal.

Depending on the usage configuration of the semiconductive member, it is necessary to adjust the upper limit of the volume specific resistance value of the resistance control layer to $10^{12}$ to $10^{13}$ Ω cm. Accordingly, using $10^8$ Ω cm as a boundary, when the value is adjusted to the region lower than this, the conductivizing agent is appropriately mixed in, and when the value is adjusted to the higher region, a polymer material is appropriately blended in.

As the polymer material, either rubber or resin may be used and there are no limitations on the quality, but a material with superior flexibility and pliability is ideal, and good following with respect to the conductive rubber layer is desirable. In particular, a normal polyurethane that does not include an ionic segment in the polymer has good affinity with the polyurethane ionomer in the present invention and is ideal. As this non-ionic polyurethane, Mirakutoran P-22S (produced by Nippon Mirakutoran) and Nipporan 2304 (products by Nippon Polyurethane Industries Co.) may be cited as examples. By blending these polyurethanes with polyurethane ionomer with a mixing ratio (by weight) of about 1.0 or less, the resistance value may be changed smoothly in accordance with the blending ratio.

For example, the volume specific resistance value of a suitable resistance control layer for a copying member is $10^{10}$ to $10^{13}$ Ω cm, and the above-described volume specific resistance value of a pressure fixation roll is $10^{12}$ Ω cm or less. These resistance control layers can be adjusted to an arbitrary resistance value within the above-described ranges by blending the polyurethane ionomer and a normal polyurethane having a volume specific resistance value on the order of $10^{15}$ Ω cm. The volume specific resistance value of the resistance control layer is determined by the demands of the system as a whole, but if the polyurethane ionomer in the present invention is used, it is possible to adjust this easily.

The thickness of the resistance control layer is preferably adjusted within the range 20 μm to 1 mm. When the thickness is thinner than 20 μm, the efficacy in raising the dielectric pressure resistance may be small, and for example when the semiconductive member is a charging member, leaks may occur easily. The thicker the thickness, the easier it is to secure a high dielectric breakdown voltage, but because the polyurethane ionomer is relatively expensive, it is desirable to adjust the thickness of the resistance layer in the semiconductive member in the range 100 to 500 μm. That is to say, if the thickness is in this range, it is possible to realize the performance of the semiconductive member without having a large impact on the product price.

When the polyurethane ionomer in the present invention is made, it is also possible to mix sufficiently a reaction material and a catalyst without a solvent and to cause a reaction to occur, but causing a reaction in an organic solvent is more advantageous in forming the resistance control layer through a coating method.

That is to say, the above-described polymer material is blended into the polyurethane reaction product as necessary, solvents are added to dilute the result and make coating easy in accordance with the solidness and viscosity of the solution containing the reaction products, and hardening agents are added as necessary. Furthermore, after the coating solution containing the polyurethane ionomer that has been made is coated onto the conductive rubber layer or the intermediate layer, the material is dried and hardened, making it possible to form the resistance control layer more simply.

As the organic solvents, benzene, toluene, xylene, methylethyl ketone, methylisobutyl ketone, cyclohexanone, dioxane, ethyl acetate, butyl acetate and the like can be used alone or in mixed solvents. Among these, a mixed solvent of an aromatic hydrocarbon such toluene and a ketone such as methylethyl ketone is ideal.

As the hardening agent, a polyisocyanate compound with low molecular weight and having an isocyanate group at the end of the molecule is ideally used. Specifically, Coronate L, 2030, HX and HL (produced by Nippon Polyurethane Industries Co.), Desmodur L, N-3300, HT (produced by Bayer AG), or Takenate D-102, D-160N or D-170N (produced by Takeda Chemical Industries) or the like may be cited.

For the same reasons as in the case of the above-described two layer structure, it is desirable to cover the resistance control layer with a surface layer (1e) even when increasing the reliability of the image formation apparatus. This surface layer is preferably made of a polymer material such as polyamide resin, polyurethane resin, or fluoro-rubber or the like the same as the above-described surface layer (1c), and the volume specific resistance value is adjusted to around the same as the resistance control layer by dispersing a conductivizing agent in the polymer material.

For a semiconductive member (1) of either a one layer or two layer structure and having a relatively thick above-described conductive elastic layer (1b), the polyurethane ionomer is relatively expensive, and consequently there are viewpoints from which it cannot be said that this is a desirable configuration, but this is actually the same as making the resistance control layer (2d, 3d) in the semiconductive member (2, 3) extremely thick.

Here, the semiconductive member of the present invention will be further described in detail. As a preferable configuration of a charging member, a semiconductive member having a three layer structure or four layer structure with the constituent components thereof being a conductive rubber layer and intermediate layer composed of silicone rubber and fluoro-rubber, respectively, can be presented.

In this kind of charging member, the conductive substrate (2a, 3a) normally has an outer diameter in the range of 4 to 10 μm, and is made of the above-described conductive material.

The conductive rubber layer (2b, 3b) has a suitable hardness and electrical resistance value so that the charging member has an appropriate nip width and nip pressure and can charge uniformly the surface of the body being charged by pressing against the surface of this body being charged. This rubber layer is made of silicone rubber alone, or of silicone rubber into which the above-described rubber material blended with the polyurethane ionomer has been mixed at a ratio of 30% by weight or less. The pliable form is ideal even in the silicone rubber, and it is desirable to use the following silicone rubbers alone particularly from the standpoint of preventing the creation of permanent warping.

As this silicone rubber, polydimethyl cyclohexane, polymethyltrifluoropropyl cyclohexane, polymethylvinyl cyclohexane, polytrifluoropropylvinyl cyclohexane, polymethylphenyl cyclohexane, and polyphenylvinyl cyclohexane, or copolymers of these with polycyclohexane may be cited as examples. The polymerization of these is preferably in the range of 5000 to 10000.

In the rubber material, the above-described conductivizing agent is an indispensable component, and various additives such as non-conductive fillers, bridging agents, catalysts and dispersion-promoting agents and the like can be mixed in as appropriate.

As non-conductive fillers, diatomaceous earth, quartz powder, dry silica, wet silica, titanium oxide, zinc oxide, aluminosilicate, calcium carbonate and the like can be cited. As bridging agents, di-t-butyl peroxide, 2,5-dimethyl-2,5-di (t-butyl peroxy) hexane, dicumyl peroxide, t-butylperoxybenzoate, p-chlorobenzoyl peroxide and the like can be cited. In addition, when liquid silicone rubber is used in place of pliable silicone rubber, a platinum-based catalyst with polyorganohydrozenecyloxane as the bridging component is preferably used.

The volume specific resistance value of the conductive rubber layer is preferably in the range of $10^4$ to $10^7$ Ω cm when a 100 V direct current voltage is impressed. For example, when carbon black is used as the conductivizing agent, 10 to 100% by weight is mixed into the rubber material. When the volume specific resistance value of the conductive rubber layer is adjusted to the above-described range, it is possible to keep the drop in the volume specific resistance value to single digits or less when 10 to 5000 V of direct current voltage is impressed. Consequently, it is possible to keep the voltage dependence of the resistance value of the conductive rubber layer small.

In addition, the thickness of the rubber layer may be in the range of 1.0 to 5.0 μm, and more preferably in the range 2.0 to 4.0 μm. When the thickness is thinner than 1.0 μm, it is difficult to secure a uniform nip. On the other hand, there is no improvement in the charging performance even if the thickness is thicker than 5.0 μm, and in addition the cost of making the rubber material rises, which is economically disadvantageous.

The intermediate layer (2c, 3c) is provided as a primer layer and as a barrier layer to prevent the migrating components in the conductive rubber layer from extruding to the surface of the charging member via the resistance control layer (2d, 3d) and the surface layer (3e). This intermediate layer is made of a fluoro-rubber containing a conductivizing agent.

As the fluoro-rubber, copolymers of olefin fluorides and copolymers of olefin fluorides or olefins of ethylene and propylene are used. As the olefin fluorides, vinylidene fluoride (VdF), hexafluoropropylene (HFP), pentaflourorpropylene, tetrafluoroethylene (TFE), trifluoroethylene, chlorotrifluoroethylene (CTFE), vinyl fluoride and perfluoroalkylvinylether and the like may be cited as examples.

Specifically, a binary copolymer of VdF-HFP, a binary copolymer of VdF-HFP, a ternary copolymer of VdF-HFP-TFE, a TFE-ethylene copolymer, and a reciprocal copolymer of TFE-propylene may be cited. Besides these, it is also possible to use a blended rubber with the above-described fluoro-rubber having as the primary components VdF and silicone rubber or fluoro-silicone rubber or the like, for example. Out these fluoro-rubbers, a VdF elastomer containing 40 to 80 mole percent VdF is particularly preferable.

In the fluoro-rubber, the conductivizing agent is an indispensable component, and mixed agents such as bridging promoting agents like oxygen-receiving agents, bridging promoting auxiliary agents, non-conductive fillers and bridging agents (hardening agents) can be added as appropriate.

As the conductivizing agent, it is possible to use a conductivizing agent such as those described above, but a carbon fluoride that has the action of reducing the resistance unevenness of the charging member and the intermediate layer is particularly ideal, and this may be used alone or with the above-described conductivizing agent.

The carbon fluoride itself exhibits non-conductivity, and is disclosed for example in Japanese Laid-Open Patent Publication 7-149448. As the carbon fluoride, it is preferable to use carbon fluoride created by fluoridating carbon black having an average particle diameter of less than 1 $\mu$m using a fluorine gas at, for example, 200 to 600° C., and having a ratio of fluorine atoms to carbon atoms (an F/C ratio) in the range of, for example, 0.3 to 1.0.

As the bridging agent and hardening agent, amines, bisphenols and peroxides may be used. Among these, amine hardening agents have an action of phenomenally increasing the adhesiveness and adhesion at the boundary surface between the conductive rubber layer and the intermediate layer, particularly between silicone rubber and VdF elastomer. Consequently, a primer process and a polishing process are not necessary when forming the intermediate layer, and consequently these are preferably used. As the amine hardening agent, Schiff salts such as N,N'-dicinnamilden-1,6-hexamethylene amine, ethylene diamine carbonate, hexamethylene diamino carbonate and other diamino carbonates, diaminocylohexane hydrochloride and other alicyclic amine salts, g-aminopropyltrimethoxysilane, g-(2-aminoethyl)aminopropyltrimethoxysilane, g-(2-aminoethyl)aminopropyldimethoxysilane and other aminosilanes may be cited as examples.

As non-conductive fillers, clay, talc, diatomaceous earth, silica and the like may be cited. In addition, in order to promote the bridging reaction of the fluoro-rubber, it is preferable to add along with the bridging agent various promoting auxiliary agents and oxygen-receiving agents such as zinc chloride, magnesium chloride, calcium chloride, MgO—$Al_2O_3$ compound oxides and the like. The amount of these mixed in is ideally 10 parts by weight, with the fluoro-rubber being 100 parts by weight.

The volume specific resistance value of the intermediate layer is preferably in the range of $10^4$ to $10^9$ $\Omega$ cm when a 100 V direct current voltage is impressed. For example, when carbon fluoride is used as the conductivizing agent, 10 to 50 parts percent by weight with respect to 100 parts by weight of the fluoro-rubber is appropriate.

In a preferable charging member, the resistance control layer (2d, 3d) has the polyurethane ionomer as a constituent component and the surface layer (3e) is made of a polymer material with conductivizing agent dispersed, as was discussed above.

The volume specific resistance value of this kind of charging member is preferably in the range of $10^5$ to $10^9$ $\Omega$ cm, the same as in the case of the two layer structure. Adjustment within the above-described range is possible by appropriately combining the resistance value and thickness of each layer that composes the charging member. When the volume specific resistance value of the charging member is less than $10^5$ $\Omega$ cm, excessive charge flows on the surface of the body being charged, and leaks occur easily as in the case where pinholes exist on the surface of the body being charged. On the other hand, when the volume specific resistance value is higher than $10^9$ $\Omega$ cm, charging of the body being charged at low voltages is difficult, causing quality defects to occur because of an insufficient charging amount.

The hardness of the charging member is particularly preferable at JIS A 40° or less. That is to say, if the hardness (hereafter called the JIS A hardness) is 40° or less, the nip uniformity with the body being charged is extremely good, so there are no concerns about quality defects occurring because of poor charging. The hardness of the charging member is in general more preferable the lower the value is, but a hardness of 20° or less is a disadvantage in terms of costs.

In addition, a convolution voltage of direct and alternating voltages is impressed between the body being charged and the above-described conductive substrate. Preferably, the direct current voltage is 300 V to 1 kV and the peak alternating current voltage is 1 to 2 kV.

The method of producing the semiconductive member of the present invention will now be described.

In the case of the two layer structure, a solution containing polyurethane reaction products dissolved in polyurethane ionomer or the above-described organic solvents and mixing agents such as rubber materials, softening agents, hardening agents, hardening auxiliary agents, conductivizing agents, non-conductive fillers, dispersion auxiliary agents and aging prevention agents and the like mixed in as necessary are sufficiently kneaded and stirred by an open roll, kneader, mixer or the like, to produce a rubber composite (rubber compound). Next, the rubber compound is formed on the conductive substrate (1a) using a compression formation method or extrusion formation method or the like, and is then hardened as necessary to form the conductive elastic layer (1b) of predetermined thickness.

Furthermore, polymer materials, conductivizing agents and suitably mixed additives are added to the organic solvents and sufficiently mixed to produce a coating solution for forming the surface layer. Next, the above-described coating solution is coated onto the conductive elastic layer (1b) using an appropriate coating method such as an immersion method, an air spray method, a roll coat method or the like, and then this is dried at room temperature or after being heated, thereby forming the surface layer (1c). Through this, the semiconductive member (1) of the present invention is produced.

For example, in the case of a four layer structure, rubber materials, conductivizing agents, vulcanizing agents and the above-described mixing agents as necessary are mixed and kneaded to produce a rubber compound. In forming the conductive rubber layer (3b), all of the normal rubber formation methods, such as the compression formation method, the transfer formation method, the extrusion formation method, the ejection formation method, the reaction pouring method or the like, may be employed.

When the rubber layer (3b) is made of a foam product, a foaming agent is mixed in or an inert gas is introduced by an aeration method, and the rubber layer can be formed through a compression formation method or the like. As foaming agents, azodicarbon amide, a,a'-azobisisobutylonitrile, diazoaminobenzene or other azo compounds, or benzenesulfonylhydrazide, p-toluenesulfonylhydrazide or other sulfohydrazide compounds, or dinitrosopentanemethylenetetramine or other nitroso compounds may be cited as examples. For the inert gases, nitrogen gas and carbonic acid gas, for example, may be used.

Next, it is possible to cover the rubber layer (3b) with an intermediate layer (3c) through a coating method similar to that of the above-described surface layer (1c). Following this, a resistance control layer (3d) is formed from a polyurethane reaction product, as described above. Furthermore, a surface layer (3e) is coated onto the resistance control layer (3d) the same as in the case of the two layer structure, thereby producing the semiconductive member (2) of the present invention.

Above, the description was primarily about a semiconductive roll, but the configuration of the semiconductive member of the present invention may be a block, blade, brush or belt or the like. For example, when the semiconductive member is a charging member, it is easy for a person with skill in the industry to understand that the present invention can be applied in a configuration other than a charging roll, such as a charging belt, charging blade, charging film or charging brush.

Figure 3A:
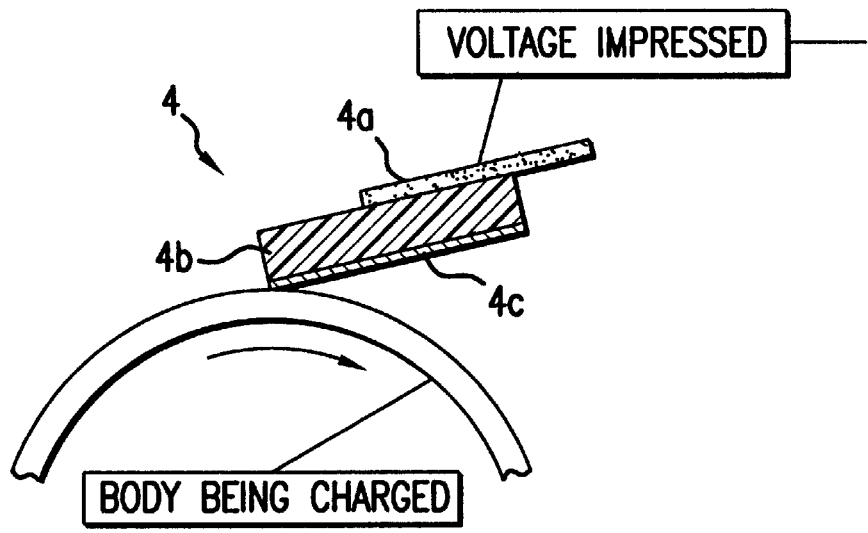
FIG. 3A illustrates a semiconductive member having a blade shape.

As one example, a blade-shaped semiconductive member is shown in FIG. 3A in an example of a two layer structure, and the conductive elastic layer 4b that is the opposite side surface from the body being charged on which the semiconductive member 4 is pressing with regard to the direction of thickness is adhered and anchored to a plate-shaped semiconductive substrate 4a with a surface layer 4c covering the elastic layer 4b.

Figure 3B:
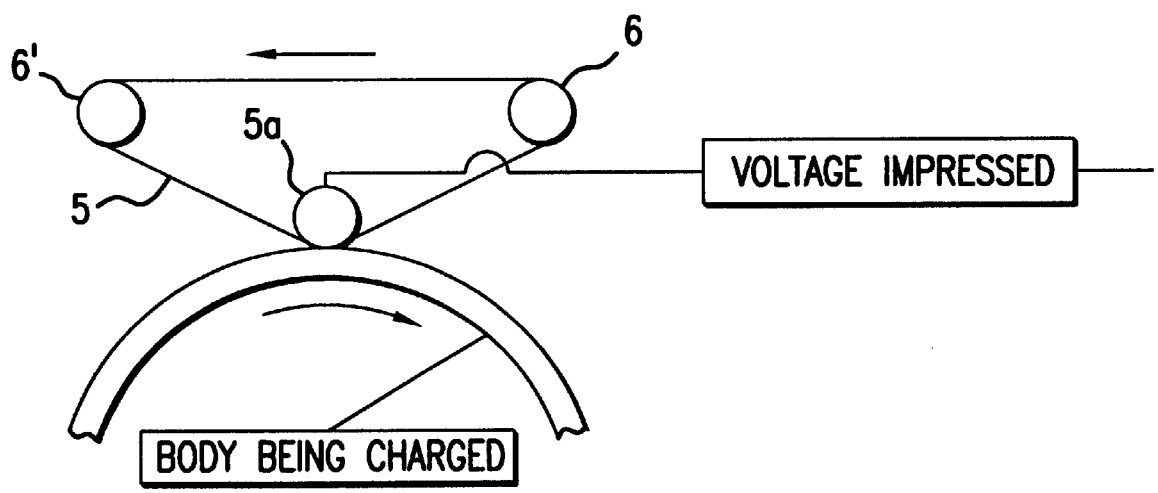
FIG. 3B illustrates a semiconductive member having a belt shape.

In addition, in the case of a belt-shaped semiconductive member, for example as shown in FIG. 3B, a semiconductive member 5 of two layer structure that moves in the direction indicated by the arrow is stretched over belt conveyor rolls 6 and 6' and an electrode roll (semiconductive substrate) 5a, and is pressed against the body being charged by the electrode roll 5a. This belt-shaped semiconductive member 5 does not necessarily have to be moved, but may also be an anchored film-type semiconductive member. The layer structure of each semiconductive member can also be the above-described single layer, three layer or four layer structure.

The polyurethane ionomer discussed above has superior properties as the material composing the above-described conductive elastic layer (1b) or the resistance control layer (2d):

i) A resistance layer in which carbon black and metal powder and the like are dispersed in general has inferior resistance uniformity, but a conductive layer having polyurethane ionomer as a constituent component has superior resistance uniformity, so that charging unevenness, copying unevenness and other image defects do not occur.

ii) The insulation voltage resistance is higher than that of the resistance layer of the conventional technology. In the conventional technology, when ion conductivizing agents such as lithium perchlorate or quaternary ammonium salt or the like are used, this kind of ionic low molecular weight compound also has a mutual effect on the function group such as other compounds like powdered hardening agents or hardening auxiliary agents or the like. As a result, the ion conductivizing agent is maldistributed in some form, and the insulation voltage resistance of the resistance layer is lowered perhaps because the electric field is concentrated there.

The conductive layer in the present invention has the polyurethane ionomer itself as the conductive material, and consequently there is no particular need for a low molecular weight conductivizing agent and it is possible to make an appropriate resistance region, so that it is possible to establish both charging and voltage resistance.

iii) The environment dependence of the resistance is extremely small, with stable properties exhibited at all times from low temperature, low humidity environments through high temperature, high humidity environments. In particular, poor charging does not occur in low temperature low humidity environments, insulation breakdown does not occur in high temperature high humidity environments, and it is possible to realize the function of the original conductive layer.

iv) In the conventional resistance layer into which ECO or ion conductivizing agent has been mixed, the resistance is too high in low temperature, low humidity environments. Even if the resistance is suitable, the problem arises that the resistance rises when electricity is supplied continuously to the charging roll, and as a result image unevenness occurs because of poor charging. In extreme cases the image is omitted. In particular, when the image is output and operation is conducted while accomplishing electricity removal through the exposure of an LED or the like, image defects occur easily. As a cause of rising resistance, it has been hypothesized that ion pairs separate when a strong electric field acts on the ion conductivizing agent, these are oxidation reduced at the electrode or the surface of the body being charged, and the charge carriers decline in number.

The conductive layer in the present invention is such that the anion or cation components of the polyurethane ionomer are restrained by specific coupling to a relatively anchored principal chain, and consequently movement such as is found in low molecular weight compounds is impossible and in addition there is no separation of the ions, so that it can be assumed that rising of the resistance is controlled.

v) When commercially marketed ECO is coated as a resistance layer, the molecular weight is too high and consequently it is impossible to dissolve this in the solvent, and an operation such as cutting the molecule chain through a temporary kneading process is necessary. On the other hand, it is possible to coat the polyurethane ionomer in a state dissolved in the solvent, and consequently the kneading operation or the like is unnecessary, allowing simplification of procedures and offering economic advantages.

Furthermore, a semiconductive charging member having a conductive rubber layer with silicone rubber as a constituent component and an intermediate layer with fluoro-rubber as a constituent component has the following operation.

vi) The silicone rubber has flexibility in the chemical structure in comparison to other hydrocarbon rubbers, and consequently has superior uniformity in the nip, and poor charging caused by permanent warping (nip deformation) does not occur. In addition, even if conductivizing agents and other inorganic fillers are mixed in, it is possible to form a conductive rubber layer with low hardness of 40° or less without using softening agents or plasticizing agents.

This kind of silicone rubber contains at most several percent of migrating components having unreacted organosiloxane as the primary component, and it is difficult to remove the migrating component as long as a solvent extrusion process is not executed over a long period of time. However, this migrating component has absolutely no permeability with respect to fluoro-rubber, and consequently there is no occurrence of the bleeding problem over the long term by coating around 5 μm of fluoro-rubber.

vii) the stability of resistance of the above-described operations iii) and iv) is improved in conjunction with the resistance control layer being made of polyurethane ionomer. As a result, rising of the resistance in the body being charged is controlled and poor charging does not occur even when high speed continuous movement at a processing speed of 100 μm/sec is performed in a low temperature, low humidity environment.

EXAMPLES

Hereafter, the present invention will be described more specifically using embodiments thereof, but the present invention is not limited to the below-described embodiments.

Image Formation Apparatus

Figure 4:
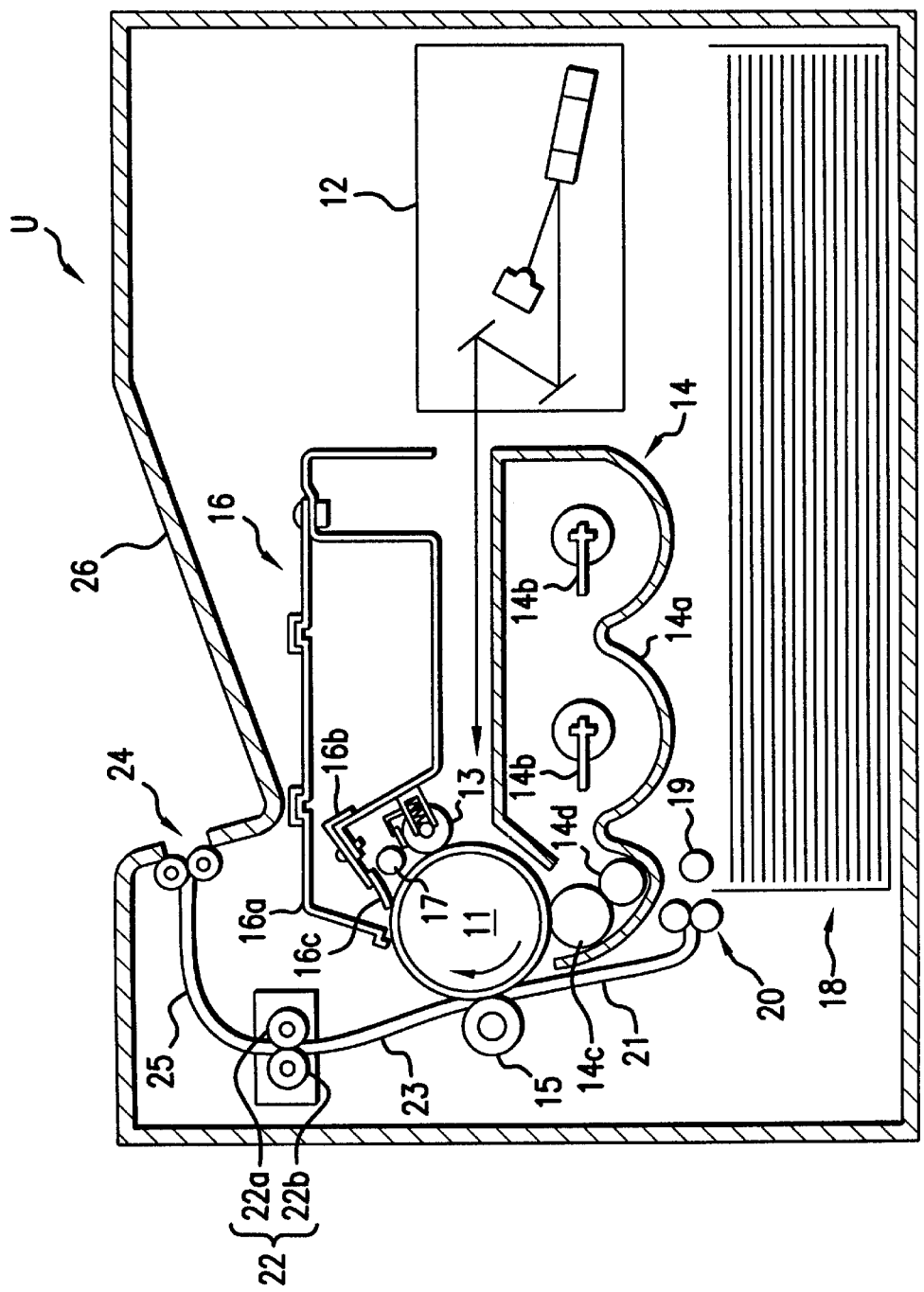
FIG. 4 is an explanatory diagram of one example of an image forming apparatus with the semiconductive member of the present invention mounted in the charging unit.

FIG. 4 is an explanatory diagram for an image forming apparatus in which the semiconductive charging member of the present invention shown in FIG. 2B is mounted as one example.

In FIG. 4, a cylindrical photosensitive body (drum) 11 that rotates in the direction indicated by the arrow is positioned inside the housing of an image forming apparatus U and functions as a static electric latent image temporary holding body. On one side inside the housing of the image forming apparatus U, a laser writing apparatus 12 that writes the static electric latent image onto the surface of the photosensitive body 11 is positioned. Around the photosensitive body 11, along the direction of rotation thereof, are positioned a charger 13 that uniformly charges the surface of photosensitive body 11, a developer 14 that makes this static electric latent image visible, a copier 15 that causes the toner image that has been made visible to be copied onto the paper (copy material), a cleaning apparatus 16 that removes residual toner from the photosensitive body 11, and an electricity removing device 17 that removes residual electric charge through exposure of an LED.

The developer 14 is provided with a container 14a holding toner. This container 14a is provided with stirring members 14b and 14b that stir the toner, a developing agent holding unit 14c that can rotate, and a toner supply roller 14d that supplies the toner to the holding unit 14c. The developing agent holding unit 14c faces the opening in the container 14a, and is supported by the container via a small gap from the surface of the photosensitive body 11. In addition, the cleaning apparatus is provided with a casing 16a. To this casing is anchored a metal blade holder 16b, and a cleaning blade 16c is attached to the tip of this. The cleaning blade 16c is such that the edge of the tip thereof makes contact with the surface of the photosensitive body 11.

On the bottom of the image forming apparatus U, a paper supply tray 18 that houses paper is positioned. On the top surface edge of the paper supply tray 18, a paper uptake roller 19 is positioned which takes the paper one sheet at a time from the paper supply tray 18. Above the side of the paper uptake roller 19 are positioned a pair of paper guides 21 that guide the paper conveyed by a pair of paper conveyance rollers 20.

At the top of the other side of the image forming apparatus U, a fixing apparatus 22 is provided which has a heat fixation roller 22a and a pressure fixation roller 22b, and a conveyance path 23 is provided which conveys the paper onto which the toner image has been copied between the fixation apparatus 22 and the above-described copier 15. In addition, above the fixation apparatus 22, a pair of discharge rollers 24 and a conveyance path 25 to guide the paper onto which the toner image has been fixed from the fixation apparatus 22 to the discharge rollers 24 are provided. Furthermore, on the top surface of the image forming apparatus U, a discharge tray 26 is formed which stores the paper discharged from the above-described discharge rollers 24.

Charger

Figure 5:
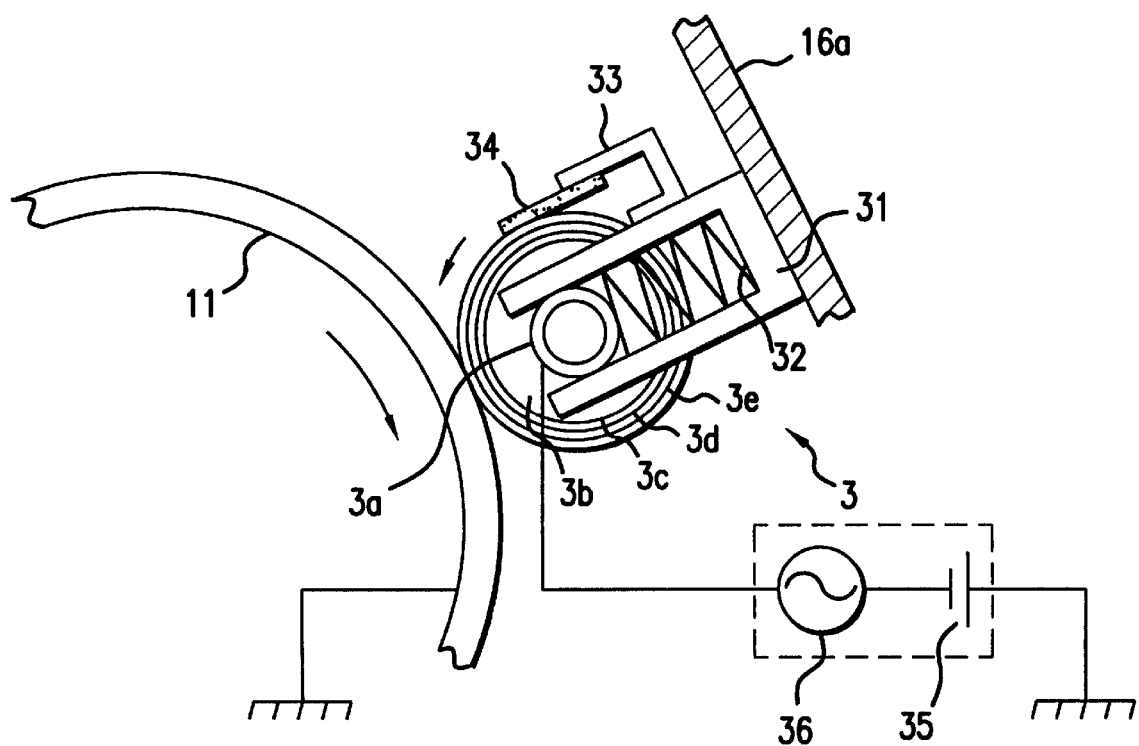
FIG. 5 is an enlargement of part of FIG. 4 showing the structure of the charger.

FIG. 5 shows the structure of the above-described charger, and is an enlargement of FIG. 4.

In FIG. 5, the charger 13 is provided with the above-described roll-shaped charging member 3. Both edges of the conductive substrate 3a of the charging member 3 are supported by a support member 31 anchored to the casing 16a of the cleaning apparatus 16. In addition, the charging member 31 is pressed against and makes contact with the surface of the photosensitive body 11 under the energizing force of two pressure springs 32, one end of which is anchored to the support member 31 and the other end of which is anchored to the substrate 3a. A metal pad holder 33 is anchored to the above-described support member 31, and toner where adheres even slightly to the surface of the charging member 3 is removed by a sheet-shaped cleaning pad 34 adhered to the tip of this pad holder.

Furthermore, a convoluted oscillating voltage from a 350 V direct current power source 35 and an alternating power source 36 with frequency 400 Hz and peak voltage ($V_{p-p}$) of 1.5 kV connected in series is impressed on the substrate 3a of the charging member 3. Accordingly, the charging member 33 can uniformly charge the surface of the photosensitive body 11 rotating in a predetermined direction while making contact with the surface layer 3e.

The operation of the image forming apparatus U in the present invention is the same as that of a conventional apparatus, and explained briefly is as follows.

As discussed above, the surface of the photosensitive body 11 rotating in the direction indicated by the arrow is uniformly charged by the charging member 3 on which a convoluted oscillating voltage is impressed. A static electric latent image is written to the uniformly charged photosensitive body 11 by the laser writing apparatus 12. The static electric latent image on the photosensitive body 11 is developed into a toner image by the developer 14. The toner image is copied onto paper conveyed from the paper supply tray 18 by the copier 15. The copied toner image is fixed by the fixation apparatus 22, and the paper is then discharged onto the discharge tray 26 by the discharge rollers 24. In addition, after the toner image has been copied onto the paper, the toner and electric charge remaining on the surface of the photosensitive body 11 are removed by the cleaning blade 16c and the electricity removing device 17, preparing the apparatus for the next image forming process.

In the embodiments hereafter, the term "part" indicating the usage rate of the reaction compounds and rubber compounds means "part by weight".

Polyurethane Ionomer Composition Example 1

Into a reactor equipped with a stirrer, a thermometer and a partial circulation cooler are placed 664.1 parts adipinic acid, 449.7 parts 1,4-butane diol and 0.01 part tetrabutyltitanate, and these are caused to react for 10 hours at 140 to 220° C. Following this, the pressure is reduced to 20 µm Hg for five hours at 180 to 220° C., and a polycondensation reaction is accomplished for 10 hours at 200 to 220° C.

The average number of hydroxyl groups per molecule in the long chain polyol that is obtained is 2.0, the hydroxyl group valency is 112 and the average molecular weight is 1000. This polyol is called "polyol A".

In addition, a polyol B is composed using the same composition method as polyol A, using the reaction materials below.

| Acid components: | |
|---|---|
| adipinic acid | 546.5 parts |
| Dimethyl isophthalate-5-sodium sulfonate | 148.1 parts |
| Polyol component: | 472.2 parts |
| 1,4-butanediol | |

In the polyol B that is obtained, the average number of hydroxyl groups per molecule is 2.0, and the average molecular weight is around 1000. This polyol B is the long chain polyol component that introduces the ionic segment into the molecule of the below-described polyurethane ionomer.

Furthermore, into a reactor equipped with a stirrer, a thermometer and a circulation-type cooler are placed 180 parts polyol A, 60 parts polyol B and 300 parts of the mixed solvent methylethylketone/toluene (3:1), and these are mixed and dissolved at 50° C. Next, 0.06 part dioctyl tin dilaurate is added as a urethane reaction catalyst, 60.0 parts diphenylmethane-4,4'-diisocyanate is added, and these are caused to react with the above-described two long chain polyol components at 75° C.

Because the viscosity rose as the reaction progressed, the mixture is diluted at the appropriate time with the above-described mixed solvent, and a uniform and transparent solution is obtained by confirming that the absorption peak of the isocyanate group is destroyed through an infrared ray absorption spectrum, and the polyurethane reaction is caused to conclude. The polyurethane ionomer solution obtained in this way has 30% solids, and the average molecular weight of the polyurethane ionomer through a polystyrene conversion using the GPC measurement is around 26000. This polyurethane ionomer is called PU-1.

Polyurethane Ionomer Composition Example 2

A polyurethane ionomer PU-2 is composed in the same manner as in composition example 1 using the reaction materials below. The average number of hydroxyl groups per molecule in polyethylene glycol (produced by Sumitomo Seika Chemicals Co.) is 2.0, and the average molecular weight is 1000.

| | |
|---|---|
| Polyisocyanate: | 43.5 parts |
| 2,4-tolylene diisocyanate | |
| Long chain polyol: | 229.3 parts |
| polyethylene glycol | |
| Compounds containing ionic segment: | |
| long chain polyol: | 6.0 parts |
| polyol B | |
| chain extending agent: | 2.0 parts |
| 2,2-dimethylol propionic acid | |

When the molecular weight of the polyurethane ionomer PU-2 thus obtained is measured the same as in composition example 1, the average molecular weight is around 26000.

Hardening of Polyurethane Ionomer and Material Measurements

A hardening agent (the above-described Takenate D-170N) is mixed into the above-described polyurethane ionomer PU-1 at a ratio of ionomer to hardening agent of 100:10 using a solid conversion, and the result is dried on separation paper and is then hardened by heating for two hours at 120° C., to form a transparent cast film of around 100 µm thickness.

The surface of this film is then wiped with methanol and dried, following which a voltage of 100 V is impressed in an environment of temperature 25° C. and humidity 50% RH, and the resistance value of this film is then measured using a resistance measuring device (body 16068A, probe 4329A, produced by Yokogawa-Hewlett-Packard), and it is found that the volume specific resistance value (rv) is $10^{8.5}$ Ω cm. In addition, the temperature of the peak loss elasticity rate is defined as the glass transition temperature (Tg), and this temperature of the peak loss elasticity rate is measured for the film using a viscoelastic measuring device (heating speed 2° C./min, frequency 35 Hz; Rheovibron DDV-2EP; produced by Orientech, and is found to be −33° C.

In addition, for the polyurethane ionomer PU-2 also, the hardening agent (Takenate D-170N) is mixed in at a ratio of 100:10 using a solid conversion, and the result is dried on separation paper and then hardened by heating for 2 hours at 120° C. to form a transparent precast film of around 100 µm thickness. When the resistance value and peak temperature of this film is measured the same as above, it is found that rv is $10^{7.5}$ Ω cm and Tg is −45° C.

Composition Examples 3 to 8

In the same way as above, polyurethane ionomers PU-3 through PU-6 and urethane polymers PU-7 and PU-8 are composed and the film hardened product is formed. These are compiled in Tables 1 and 2. The polyol I in the table is a long chain polyol not containing an ionic segment, and the polyol II is a long chain polyol containing an ionic segment. In Tables 1 and 2, the polyols in composition examples 3 to 8 are used by composing or purchasing components so that the average number of hydroxyl groups per molecule is 2.0 and the average molecular weight (Mn) is 1000.

In Table 1, MPTS (methyl p-toluene sulfonate) shown in the chain extending agent column for composition example 6 is a quaternizing agent, and in the below-described embodiment 8, a p-toluene sulfonic acid salt of N,N-dimethyl-N,N-di (2-hydroxyethyl) ammonium obtained by methylizing an N-methyl diethanol amine (MDEA) using the MPTS is used as the chain extending agent.

The abbreviations for compounds in Tables 1 and 2 are as noted below, and "Mw" in Table 2 has the meaning of weighted average molecular weight.

PEG: polyethylene glycol
PPG: polypropylene glycol
AA: adipinic acid
1,6-HD: 1,6-hexane diol
EG: ethylene glycol
PO: propylene oxide
1,4-BD: 1,4-butane diol
THF: tetrahydrofuran
5-SS: dimethyl isobutalic acid-5-sodium sulfonate
DMPA: 2,2-dimethylolpropionic acid
IPDA: isophorone diamine
MEA: monoethanol amine
MDI: diphenylmethane-4,4'-diisocyanate
TDI: 2,6-tolylene diisocyanate
D-170N, D-160N, D-102: hardening agents (trade name: Takenate, produced by Takeda Chemical Industries).

C. and vulcanized by maintaining this temperature for 10 minutes. Through the above compression formation method, a conductive rubber layer (3b) is formed in which rv is $10^7$ Ω cm.

| | |
|---|---|
| SBR (SL574; produced by Japan Synthetic Rubber Co.) | 100 parts |
| Carbon black (Ketchen black; produced by Lionakzo) | 20 parts |
| Naphthene-based oil | 40 parts |
| Organic peroxide-based vulcanizing agent (Daikaabu 40C; produced by Hercules) | 5 parts |
| Triphenyl methane-α-isocyanate | 0.5 parts |

An intermediate layer (3c) is formed on the rubber layer (3b) so that no migrating components of bleeding are contained in the above-described conductive rubber layer (3b). That is to say, a coating solution of 15% solids by weight composed of 100 parts polyamide resin (above-described Amilan CM-8000) and 100 parts carbon black added to a mixed solvent of methanol-butanol is coated onto

TABLE 1

| | | Long chain polyol | | Chain | |
|---|---|---|---|---|---|
| | Name | I Components (composition) | II Components (composition) | extending agent Components (composition) | Isocyanate Component |
| Composition example 1 | PU-1 | Polyol A | Polyol B | | MDI |
| Composition example 2 | PU-2 | PEG (Mn: 1000) | Polyol B | DMPA | TDI |
| Composition example 3 | PU-3 | PEG (Mn: 1000) | Polyol B | DMPA | MDI |
| Composition example 4 | PU-4 | PPG (Mn: 1000) | Polyol B | IFDA (8.2) MEA (1.2) | MDI |
| Composition example 5 | PU-5 | AA (505.1) 1,6-HD (619.5) | AA (392.9) 5-SS (148.1) 1,4-BD (587.9) | | TDI |
| Composition example 6 | PU-6 | EG (62.07) PO (937.9) | | MDEA (1.8) MPTS (2.8) | MDI |
| Composition example 7 | PU-7 | AA (564.5) 1,4-BD (499.7) | | | MDI |
| Composition example 8 | PU-8 | 1,4-BD (45.1) THF (954.9) | | | MDI |

TABLE 2

| | Composition of polyurethane ionomer | | | | | | | | |
|---|---|---|---|---|---|---|---|---|---|
| | Polyol | | | | | | | | |
| | I | II | Chain | Isocyanate | | Molecular | Hardening | | |
| | Mixing | Mixing | extending agent | Mixing | | weight × $10^4$ | agent | Tg | rv |
| Name | amount | amount | Mixing amount | amount | Mn | Mw | Component | °C. | (Ω cm) |
| PU-1 | 180.0 | 60.0 | | 60.0 | 2.6 | 5.1 | D-170N | −33 | 8.5 |
| PU-2 | 229.3 | 6.0 | 2.0 | 43.5 | 2.6 | 5.4 | D-170N | 45 | 7.5 |
| PU-3 | 229.3 | 6.0 | 2.0 | 62.6 | 1.7 | 3.9 | D-170N | 53 | 7.9 |
| PU-4 | 160.7 | 60.0 | 9.4 | 69.8 | 3.1 | 5.8 | D-160N | 41 | 6.9 |
| PU-5 | 198.8 | 30.0 | | 71.2 | 4.2 | 8.5 | D-160N | 11 | 8.5 |
| PU-6 | 233.3 | | 4.6 | 62.1 | 5.3 | 11.1 | D-160N | −41 | 6.8 |
| PU-7 | 240.0 | | | 60.0 | 4.9 | 10.1 | D-102 | 30 | 9.5 |
| PU-8 | 266.6 | | | 33.4 | 1.9 | 4.1 | D-170N | −62 | 13.5 |

Embodiment 1

After the below-described rubber compound has been kneaded using normal methods, the resulting rubber kneaded product is wrapped with a thickness of 3 μm around a stainless steel core (3a) of length 297 μm and outer diameter 6 μm which has undergone a primer process beforehand. This unvulcanized rubber roll is heated to 170° the outer periphery surface of the rubber layer (3b), and is then heated for 30 minutes at 120° C. to form an intermediate layer (3c) of thickness 10 μm.

The roll intermediate product (I) having a two layer thus obtained is used in each of the embodiments 1–8 hereafter, and a semiconductive charging roll (3) is produced by forming a resistance control layer (3d) and a surface layer (3e).

A hardening agent (Takenate D-170N) is sufficiently mixed into the above-described polyurethane ionomer PU-1 solvent at a ratio of 100:10 of solids, and the mixed solvent of methylethylketone/toluene (3:1) is further added, and the solution is diluted so that the viscosity is 150 cps. Next, this solution is coated onto the surface of the above-described roll intermediate product (I) and is then dried for 30 minutes at 80° C., and after this is hardened for two hours at 120° C. to form a resistance control layer (3d) of thickness 150 μm.

Furthermore, a surface layer (3e) of thickness 10 μm is formed on the resistance control layer (3d) in the same manner as the formation of the intermediate layer (3c) except that the amount of carbon black added is changed to 75 parts.

In this way, a semiconductive charging roll (3) is produced.

Embodiment 2

A semiconductive charging roll is produced the same as in embodiment 1 except that the polyurethane ionomer PU-1 is changed to the polyurethane ionomer PU-2.

Embodiment 3

The coating solution of the below-described compounds is coated onto the resistance control layer formed in embodiment 2, and is then hardened for 30 minutes at 120° C. to form a surface layer of thickness 10 μm. The semiconductive charging roll thus produced is composed of the same layer structure as the charging roll of embodiment 2 except that the surface layer differed.

| | |
|---|---|
| Polyester polyol (above-described Hi-urethane No. 5001) | 100 parts |
| Hexamethylene diisocyanate-based hardening agent (51HF; produced by NOF Corp.) | 20 parts |
| Carbon black | 75 parts |

Embodiment 4

A semiconductive charging roll is produced the same as in embodiment 3 except that the above-described compound of embodiment 3 is changed to a coating solution of the below-described compound.

| | |
|---|---|
| Polyurethane fluoride (Lumiflon series LF601) | 100 parts |
| Hexamethylene diisocyanate-based hardening agent (Coronate HZ) | 11 parts |
| Carbon black | 75 parts |

Embodiments 5 to 8

The various semiconductive charging rolls shown in Table 3 below are produced by forming a roll having the polyurethane ionomer PU-3 through PU-6 obtained in composition examples 3 to 6 as the resistance control layer on the above-described roll intermediate product (I) have a two layer structure, and by then forming a surface layer the same as in embodiments 1, 3 and 4.

Comparison Example 1

The above-described roll intermediate product (I) having a two layer structure is used as the charging roll without change, and is submitted to the below-described performance evaluation tests.

Comparison Example 2

A semiconductive charging roll is produced the same as in embodiment 1 except that the polyurethane ionomer PU-7 obtained in composition example 7 is used as the constituent component of the resistance control layer.

Comparison Example 3

A semiconductive charging roll is produced the same as in embodiment 1 except that the polyurethane ionomer PU-8 obtained in composition example 8 is used as the constituent component of the resistance control layer.

Comparison Example 4

After the below-described rubber compound has been kneaded using normal methods, the resulting rubber kneaded product is dissolved along with ECO in a mixed solvent of methylethylketone/toluene (1:1). Then, the coating solution with ECO dissolved is used in place of the polyurethane ionomer PU-1 solution of embodiment 1, and this coating solution is hardened for 1 hour at 150° C. to form a resistance control layer (3d), and other than this the semiconductive charging roll is produced the same as in embodiment 1.

| | |
|---|---|
| ECO (CG-102; produced by Daiso Co.) | 100 parts |
| 2,4,6-trimercapto-s-triazine (JISNett-T; produced by Nippon Zeon Co.) | 0.9 part |
| N-(cyclohexylthio) phthalimide (Santoguard PVI; produced by Monsanto) | 1 part |
| Nickel dithiocarbamate (NBC; produced by Du Pont) | 1 part |
| Stearic acid | 2 parts |
| Magnesium oxide | 5 parts |

Comparison Example 5

Unlike the coating solution with ECO dissolved shown in comparison example 4, anhydrous lithium perchlorate is dissolved beforehand in a small amount of methylethylketone so that the mixing amount is 1 part with respect to 100 parts of ECO and both are mixed prior to coating and then coated, and other than this the semiconductive charging roll is produced the same as in comparison example 4.

Performance Evaluation Test

Each of the semiconductive charging rolls in embodiments 1 to 8 and comparison examples 1 to 5 are mounted in the charging unit in a toner kit housed in a page printer (PR1000/4-11; produced by NEC) with a processing speed of 56 μm/sec, and image output tests are conducted.

In order to evaluate the insulation voltage resistance, a 1 μm hole is made passing through the charge transporting layer and the charge producing layer of the surface of the photosensitive body, and the image quality is evaluated by conducting image output in environments with low temperature and low humidity (10° C., 15% RH) and high temperature and high humidity (28° C., 85% RH). In addition, the image quality is evaluated by conducting a continuous 20,000 sheet print test in a low temperature and low humidity environment while executing the electricity removing procedure using exposure of the LED after the copying procedure of the above-described page printer. Furthermore, in order to evaluate bleeding, the apparatus is left for 4 weeks in an environment at 45° C. and 85% RH and is then returned to room temperature and left for one day and night, following which image output is conducted and the absence or presence of stains on the surface of the photosensitive body is judged.

These evaluation results are shown in Table 3 along with the layer composition of each of the charging rolls. The "○" symbols in table 3 indicate that good results are obtained.

| Fluoro-rubber | 100 parts |
| VdF-HFP-TFE ternary copolymer | |
| Carbon fluoride | 20 parts |
| F/C ratio: 0.45; specific surface area: 150 m²/g | |
| Amine hardening agent | 2.5 parts |

The coating solution thus obtained is directly coated onto the outer periphery surface of the silicone rubber form at a

TABLE 3

| | Layer structure | | | | Evaluation item | | | |
| --- | --- | --- | --- | --- | --- | --- | --- | --- |
| | Elastic layer | Intermediate layer | Resistance layer | Surface layer | Low temp., low humidity image quality | High temp., high humidity image quality | Low temp., low humidity continuous operation | Bleeding |
| Embod. 1 | SBR | Polyamide | PU-1 | Polyamide | ○ | ○ | ○ | ○ |
| Embod. 2 | SBR | Polyamide | PU-2 | Polyamide | ○ | ○ | ○ | ○ |
| Embod. 3 | SBR | Polyamide | PU-2 | Polyurethane | ○ | ○ | ○ | ○ |
| Embod. 4 | SBR | Polyamide | PU-2 | Fluorine polyurethane | ○ | ○ | ○ | ○ |
| Embod. 5 | SBR | Polyamide | PU-3 | Polyamide | ○ | ○ | ○ | ○ |
| Embod. 6 | SBR | Polyamide | PU-4 | Polyamide | ○ | ○ | ○ | ○ |
| Embod. 7 | SBR | Polyamide | PU-5 | Polyurethane | ○ | ○ | ○ | ○ |
| Embod. 8 | SBR | Polyamide | PU-6 | Fluorine polyurethane | ○ | ○ | ○ | ○ |
| Comp. Ex. 1 | SBR | Polyamide | | | Black streaks | ○ | ○ | ○ |
| Comp. Ex. 2 | SBR | Polyamide | PU-7 | Polyamide | Poor charging | ○ | ○ | ○ |
| Comp. Ex. 3 | SBR | Polyamide | PU-8 | Polyamide | Poor charging | Charging unevenness | Poor charging | ○ |
| Comp. Ex. 4 | SBR | Polyamide | ECO | Polyamide | Poor charging | ○ | Poor charging | ○ |
| Comp. Ex. 5 | SBR | Polyamide | ECO LiClO₄ | Polyamide | ○ | ○ | Poor charging | ○ |

Embodiment 9

One hundred parts pliable silicone rubber compound (SE4637; produced by Toray Dow Corning), into which about 30% by weight of carbon black is mixed in as a conductivizing agent, and 1.5 parts vulcanizing agent paste (RC-4 50PFD; produced by Toray Dow Corning) containing a peroxide are kneaded for 10 minutes using an open roll to produce a silicone rubber compound in which the carbon black is uniformly dispersed.

Next, a stainless steel core (3a) 6 µm in outer diameter having undergone a primer process beforehand is inserted concentrically onto and supported by the center of a cylindrical metal mold with inner diameter 12 µm. The cavity of this mold is then filled with the above-described rubber compound using an ejection forming method, and is then heated for three minutes at 170° C. to accomplish vulcanization.

In this way, a roll is formed having as the conductive rubber layer (3b) a silicone rubber formation containing carbon black and having an outer diameter of 11.8 µm (thickness 2.9 µm). The hardness of this conductive rubber layer is 35°. In addition, the volume specific resistance value of the rubber layer (3b) when a 100 V direct current voltage is impressed is $5 \times 10^6$ Ω cm, and the volume specific resistance value after a 1 kV direct current voltage is impressed is $1.5 \times 10^6$ Ω cm.

Next, an amine hardening agent is added to a compound of 10% solid parts in which fluoro-rubber, in which carbon fluoride was mixed as a conductivizing agent, is dissolved in butyl acetate, and this is mixed and stirred to produce a coating solution for forming the surface layer. The composition of the coating solution is as follows.

speed of 300 µm/min using an immersion coating method. After being dried to the touch through air drying, the product is heated for 30 min in an oven at 200° C. causing the fluoro-rubber to harden, thereby directly forming a uniform coating film of thickness 10 µm on the above-described conductive rubber layer (3b). In this way, a roll intermediate produce (II) having fluoro-rubber as the intermediate layer (3c) is produced. The volume specific resistance value of this intermediate layer (3c) is $1 \times 10^8$ Ω cm.

The roll intermediate product (II) obtained above with a two layer structure is used in embodiments 9 through 13 hereafter, and a semiconductive charging roll (3) is produced by forming on this intermediate product a resistance control layer (3d) and a surface layer (3e).

A hardening agent (above-described Desmodur HT) at a ratio of 100:10 comparing solid parts is sufficiently mixed into a 30% solid solution of the polyurethane ionomer PU-2 dissolved in a mixed solvent of methylethylketone/toluene (3:1), the above-described mixed solvent is further added to attain dilution such that the viscosity of the solution is 150 cps. Next, the coating solution thus obtained is directly coated onto the outer periphery surface of the above-described roll intermediate product (II) at a speed of 300 µm/min using an immersion coating method. After being dried to the touch through air drying, the product is heated for 90 min in an oven at 120° C. causing the PU-2 to harden, thereby directly forming on the conductive rubber layer (3b) a resistance control layer (3d) of thickness 120 µm. The volume specific resistance value of this resistance control layer (3d) is $2 \times 10^7$ Ω cm.

Because of concerns about tacking with the above-described resistance control layer (3d), a surface layer (3e) was also formed. That is to say, a coating solution is produced by adding and dispersing 100 parts conductive tin oxide $SnO_{2-x}$ coat barium sulfide (Pastran produced by Mitsui Mining & Smelting Co.) into a solution made by dissolving 100 parts of polyamide resin (above-described Amilan CM-8000) into a mixed solvent of methanol-butanol. After being coated onto the periphery surface of the resistance control layer (3d), this is then heated for 30 minutes in an oven at 150° C. to form a surface layer (3e) of thickness 10 μm.

In this way, a semiconductive charging roll (3) is produced.

Embodiment 10

A semiconductive charging roll is produced the same as in embodiment 9 except that the polyurethane ionomer PU-2 is changed to the polyurethane ionomer PU-1.

Embodiment 11

A semiconductive charging roll is produced the same as in embodiment 9 except that the amine hardening agent is changed to 0.5 part g-(2-aminoethyl) aminopropyltrimethoxysilane (SH6020; produced by Toray Dow Corning).

Embodiment 12

A semiconductive charging roll is produced the same as in embodiment 9 expect that the surface layer is changed to one that was the same as that of embodiment 4.

Embodiment 13

A semiconductive charging roll is produced the same as in embodiment 9 except that the polyurethane ionomer PU-2 is changed to the polyurethane ionomer PU-4.

Comparison Example 1

The above-described roll intermediate product (I) is submitted to the below-described charging test without change as the charging roll.

Comparison Example 6

After the compound described below is coated onto the resistance control layer formed in comparison example 4, the product is heated to form a surface layer of thickness 10 μm. The semiconductive charging roll thus produced has the same layer composition as the roll of comparison example 4 with the exception that the surface layer differed.

| | |
|---|---|
| N-methoxymethyl nylon (above-described Trejin EF-30T) | 100 parts |
| carbon black | 50 parts |
| methanol | 500 parts |

Comparison Example 7

Unlike the coating solution with ECO dissolved shown in comparison example 4, anhydrous lithium perchlorate is dissolved beforehand in a small amount of methylethylketone so that the mixing amount is one part with respect to 100 parts of ECO, and both are mixed immediately prior to coating and then coated. Other than this, the semiconductive charging roll is produced the same as in comparison example 6.

Comparison Example 8

The semiconductive charging roll is produced by forming a resistance layer and surface layer the same as in comparison example 6 on the surface of the roll intermediate product (II).

Performance Evaluation Test

The semiconductive charging rolls of embodiments 9 to 13 and comparison examples 1 and 6 to 8 are tested by mounting these rolls in a charging unit in the toner kit of a page printer (above-described PR1000/4-11). However, the above-described page printer is improved so as to operate at a processing speed of 163 μm/sec.

Furthermore, the insulation voltage resistance in low temperature and low humidity environments, the image quality during a continuous 20,000 sheet print test, and bleeding are evaluated under the same conditions as in the above-described evaluation test. Furthermore, in order to evaluate the absence or presence of poor charging occurrences caused by nip deformation (permanent warping), the printer is left for two weeks in an environment at 45° C. and 95% RH and then returned to room temperature, and left for another day and night before printing is performed, and the absence or presence of irregularities in quality is judged.

These evaluation results are shown in Table 4 below along with the layer composition of each charging roll. The "○" symbols in Table 4 indicate that good results are obtained.

TABLE 4

| | Layer structure | | | | Evaluation item | | | |
|---|---|---|---|---|---|---|---|---|
| | Elastic layer | Intermediate layer | Resistance layer | Surface layer | Low temp., low humidity image quality | Low temp., low humidity continuous operation | Bleeding | Nip deformation |
| Embod. 9 | Silicone rubber | Fluoro-rubber | PU-2 | Polyamide | ○ | ○ | ○ | ○ |
| Embod. 10 | Silicone rubber | Fluoro-rubber | PU-1 | Polyamide | ○ | ○ | ○ | ○ |
| Embod. 11 | Silicone rubber | Fluoro-rubber | PU-2 | Polyamide | ○ | ○ | ○ | ○ |
| Embod. 12 | Silicone rubber | Fluoro-rubber | PU-2 | Fluorine polyurethane | ○ | ○ | ○ | ○ |
| Embod. 13 | Silicone rubber | Fluoro-rubber | PU-4 | Polyamide | ○ | ○ | ○ | ○ |
| Comp. Ex. 1 | SBR | Polyamide | | | Black streaks | ○ | ○ | Deformation occurred |
| Comp. Ex. 6 | SBR | Polyamide | ECO | Polyamide | Poor charging | Poor charging | ○ | Deformation occurred |
| Comp. Ex. 7 | SBR | Polyamide | ECO LiClO$_4$ | Polyamide | ○ | Poor charging | ○ | Deformation occurred |
| Comp. Ex. 8 | Silicone rubber | Fluoro-rubber | ECO | Polyamide | ○ | Poor charging | ○ | ○ |

Embodiment 14

After 30 parts of the above-described polyurethane ionomer PU-1 and 70 parts of polyurethane (the above-described Nipporan 2304) are sufficiently mixed together, a hardening agent (Coronate HZ) is further mixed in so that the ratio of PU-1 to hardening agent was 100:10 as solids, a mixed solvent of methylethylketone/toluene (3:1) is added and dilution is achieved so that the viscosity of the solution containing PU-1 is around 150 cps. The resulting solution is coated onto the surface of the roll intermediate product (1) and is dried for 30 minutes at 80° C., after which the product was hardened for two hours at 120° C. to form a resistance control layer (3d) with a thickness of 100 μm. In this way, a semiconductive copying roll (3) is produced wherein the volume specific resistance value of the resistance control layer (3d) is $10^{11}$ Ω cm.

Embodiment 15

A semiconductive copying roll is produced the same as in embodiment 14 except that the polyurethane ionomer PU-1 is changed to the above-described PU-2.

Comparison Example 1

The above-described roll intermediate product (I) is submitted to the below-described copying test without change as the copying roll.

Comparison Example 9

A semiconductive copying roll is produced the same as in embodiment 14 expect that the polyurethane ionomer PU-1 and hardening agent are omitted as constituent components of the resistance control layer.

Performance Evaluation Test

Each of the semiconductive copying rolls is mounted in the copier of a page printer (above-described PR1000/4-11), and image output tests are conducted.

In order to evaluate the insulation voltage resistance, a 1 μm hole is made passing through the charge transport layer and the charge creating layer of the surface of the photosensitive body, image output is conducted in environments with low temperature and low humidity (10° C., 15% RH) and high temperature and high humidity (28° C., 85% RH), and the image quality is evaluated.

In addition, in order to evaluate bleeding, each semiconductive copying roll is left for four weeks in an environment at 45° C. and 85% RH and then returned to room temperature and left for one day and night, following which the rolls are each mounted in the toner kit and image output is conducted, and the absence or presence of stains on the surface of the photosensitive body is judged.

The results of these evaluations are shown in Table 5.

TABLE 5

|  | Embodiment 14 | Embodiment 15 | Comparison example 1 | Comparison example 9 |
|---|---|---|---|---|
| Conductive rubber layer | SBR | SBR | SBR | SBR |
| Intermediate layer | Polyamide resin | Polyamide resin | Polyamide resin | Polyamide resin |
| Resistance control layer | Blended material: PU-1 Polyurethane | Blended material: PU-2 Polyurethane |  | Polyurethane |
| Surface layer |  |  |  |  |
| Low temperature, low humidity image quality | Good | Good | Black streaks | Poor copying |
| High temperature, high humidity image quality | Good | Good | Insulation breakdown | Good |
| Bleeding | Did not occur | Did not occur | Did not occur | Did not occur |

Embodiment 16

After 100 parts of the polyurethane ionomer PU-1 and 100 parts of polyurethane (the above-described Mirakutoran P-22S) are sufficiently mixed together, a hardening agent (Coronate HZ) is further added and sufficiently mixed in so that the ratio of the solids of PU-1 to hardening agent was 100:10. A mixed solvent of methylethylketone/toluene (3:1) is added and dilution is achieved so that the viscosity of the solution is around 150 cps. The resulting solution is coated onto the surface of the roll intermediate product (1) and is dried for 30 minutes at 80° C., after which the product is hardened for two hours at 120° C. to form a resistance control layer (2d) with a thickness of 20 μm and a volume specific resistance value of $10^{10}$ Ω cm. In this way, a semiconductive pressure fixation roll (2) having a three layer structure is produced.

Comparison Example 10

The semiconductive pressure fixation roll is produced the same as in embodiment 16 except that the polyurethane ionomer PU-1 and hardening agent are omitted as constituent components of the resistance control layer.

Performance Evaluation Tests

Each of the semiconductive pressure fixation rolls is mounted into the fixation unit in a laser printer (Laser Press 4160; produced by Fuji Xerox), a 20,000 sheet actual run test is conducted for each in environments with low temperature and low humidity (10° C., 15% RH) and high temperature and high humidity (28° C., 85% RH), and the absence or presence of toner offset is evaluated.

The results of these evaluations are shown in Table 6 below.

TABLE 6

|  | Embodiment 16 | Comparison example 10 |
|---|---|---|
| Conductive rubber layer | SBR | SBR |
| Intermediate layer | polyamide resin | polyamide resin |
| Resistance control layer | Blended material: PU-1 | Polyurethane |
| Surface layer | Polyurethane |  |
| Toner offset (low temperature, low humidity) | No occurrence | occurred starting with sheet 1000 |
| Toner offset (high temperature, high humidity) | No occurrence | occurred starting with sheet 500 |

Embodiment 17

Hardening agent (Desmodur HT) Is sufficiently mixed into the polyurethane ionomer PU-1 obtained in composition example 1 so that the ratio is 100:10 as solids. The resulting mixture is poured into a mold and hardened for 30 minutes at 120° C. to form a conductive elastic layer (4b) of thickness 2 µm made of polyurethane ionomer. The volume specific resistance value of this conductive elastic layer (4b) is $10^9$ Ω cm, and a single layer semiconductive cleaning and electricity removing blade (4) is produced by adhering and anchoring the elastic layer (4b) to a stainless steel thin plate (4a).

Comparison Example 11

A urethane polymer is produced substantially the same as in composition example 1 except that dimethyl isophthalic acid-5-sodium sulfonate is not used as the copolymer component of the polyol B. Furthermore, the cleaning and electricity removing blade is produced the same as in embodiment 17 expect that this polymer is used instead of the polyurethane ionomer PU-1.

Performance Evaluation Test

The electricity removing device (17) of the above-described image forming apparatus (U) is removed, and the cleaning and electricity removing blades of embodiment 17 and comparison example 17 are used in place of the cleaning blade (16c).

That is to say, each cleaning and electricity removing blade is mounted in the cleaning apparatus in the printer (Laser Press 4160; produced by Fuji Xerox) and a 1,000,000 sheet image output test is conducted. With the cleaning and electricity removing blade of embodiment 17, no abnormalities in image quality are observed. On the other hand, with the cleaning and electricity removing blade of comparison example 11, poor cleaning occurred because electric charge accumulated on the blade.

Efficacy of the Invention

The semiconductive member of the present invention has as a constituent component a polyurethane ionomer in which a specific ionic segment is replaced, and consequently it is possible to improve the environment dependence of the performance members used in various procedures in image formation.

In addition, with the semiconductive charging member of the present invention, the environment dependence of electrical resistance is improved, and in addition, bleeding does not occur in high temperature and high humidity environments, quality abnormalities caused by permanent warping deformation of the conductive rubber layer do not occur, and defects in conventional technology such as rising resistance with repeated usage in low temperature and low humidity environments are greatly improved.

What is claimed is:

1. A semiconductive member comprising at least a conductive substrate and a conductive layer composed of a polyurethane ionomer, wherein the polyurethane ionomer has in the molecule at least one type of ionic segment selected from a sulfonic acid group, a carboxyl group, a tertiary amino radical, or salts thereof.

2. The semiconductive member as defined in claim 1, wherein the conductive layer is comprised of at least a conductive rubber layer and a resistance control layer formed thereon composed of the polyurethane ionomer as a constituent component.

3. The semiconductive member as defined in claim 1, wherein the polyurethane ionomer has a glass transition temperature of 30° C. or less and a volume specific resistance value in the range of $10^6$ to $10^9$ Ω cm.

4. The semiconductive member as defined in claim 3, wherein the polyurethane ionomer is a reaction product of either an organic polyisocyanate and a long chain polyol, or of an organic polyisocyanate, a long chain polyol and a chain extending agent.

5. The semiconductive member as defined in claim 4, wherein a polyester polyol is used as the long chain polyol, and at least one of the polyester polyol and the chain extending agent contains the ionic segment.

6. The semiconductive member as defined in claim 5, wherein 5-sulfoisophthalic acid, a carboxylic acid ester thereof or a sulfonate of these is used as a monomer component of the polyester polyol.

7. The semiconductive member as defined in claim 5, wherein di-methylol propionic acid or N,N-dimethyl-N,N-di(2-hydroxyethyl) ammonium salt is used as the chain extending agent.

8. The semiconductive member as defined in claim 4, wherein the molecular weight of the long chain polyol is in the range of 300 to 10000.

* * * * *